US012301323B2

(12) United States Patent
Eistein et al.

(10) Patent No.: US 12,301,323 B2
(45) Date of Patent: May 13, 2025

(54) COEFFICIENT ESTIMATION FOR NON-LINEARITY CANCELLATION

(71) Applicant: QUALCOMM Incorporated, San Diego, CA (US)

(72) Inventors: Yaniv Eistein, Tel Aviv (IL); Ronen Shaked, Kfar Saba (IL); Gideon Shlomo Kutz, Ramat Hasharon (IL); Aviv Regev, Tel Aviv (IL); Amit Moses, Tel Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 85 days.

(21) Appl. No.: 18/469,266

(22) Filed: Sep. 18, 2023

(65) Prior Publication Data

US 2025/0096874 A1 Mar. 20, 2025

(51) Int. Cl.
*H04B 7/06* (2006.01)
*H04B 7/08* (2006.01)
*H04W 72/1273* (2023.01)

(52) U.S. Cl.
CPC ......... *H04B 7/0634* (2013.01); *H04B 7/0828* (2013.01); *H04B 7/0854* (2013.01); *H04W 72/1273* (2013.01)

(58) Field of Classification Search
CPC .. H04B 7/0634; H04B 7/0828; H04B 7/0854; H04W 72/1273
See application file for complete search history.

(56) References Cited

U.S. PATENT DOCUMENTS

| | | | |
|---|---|---|---|
| 2013/0089156 A1* | 4/2013 | Gautier | H04N 19/44 375/240.25 |
| 2013/0089159 A1* | 4/2013 | Liu | H04B 7/026 375/267 |
| 2019/0190648 A1* | 6/2019 | Reimer | H04B 10/25137 |
| 2023/0291612 A1* | 9/2023 | Shaked | H04L 5/0048 |

* cited by examiner

*Primary Examiner* — Sung S Ahn
(74) *Attorney, Agent, or Firm* — Harrity & Harrity, LLP

(57) ABSTRACT

Various aspects of the present disclosure generally relate to wireless communication. In some aspects, a network node may apply a precoding operation to a downlink physical channel. The network node may obtain a plurality of coefficients associated with a non-linearity of the downlink physical channel in accordance with estimating a cross-correlation of a plurality of power delay profiles associated with the precoding operation. The network node may precode a physical downlink shared channel communication in accordance with a result of the precoding operation. The network node may transmit the plurality of coefficients via a physical downlink control channel communication. Numerous other aspects are described.

30 Claims, 12 Drawing Sheets

COEFFICIENT ESTIMATION FOR NON-LINEARITY CANCELLATION

FIELD OF THE DISCLOSURE

Aspects of the present disclosure generally relate to wireless communication and to techniques and apparatuses for coefficient estimation for non-linearity cancellation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a network node. The method may include applying a precoding operation to a downlink physical channel. The method may include obtaining a plurality of coefficients associated with a non-linearity of the downlink physical channel in accordance with estimating a cross-correlation of a plurality of power delay profiles associated with the precoding operation. The method may include precoding a physical downlink shared channel communication in accordance with a result of the precoding operation. The method may include transmitting the plurality of coefficients via a physical downlink control channel communication.

Some aspects described herein relate to a method of wireless communication performed by a UE. The method may include receiving a physical downlink shared channel communication that includes a precoding data indication. The method may include receiving a physical downlink control channel communication that includes a plurality of coefficients. The method may include generating a plurality of non-linearity approximation signals in accordance with the plurality of coefficients. The method may include cancelling the plurality of non-linearity approximation signals from the physical downlink shared channel communication.

Some aspects described herein relate to an apparatus for wireless communication at a network node. The apparatus may include one or more memories and one or more processors coupled to the one or more memories. The one or more processors may be configured to apply a precoding operation to a downlink physical channel. The one or more processors may be configured to obtain a plurality of coefficients associated with a non-linearity of the downlink physical channel in accordance with estimating a cross-correlation of a plurality of power delay profiles associated with the precoding operation. The one or more processors may be configured to precode a physical downlink shared channel communication in accordance with a result of the precoding operation. The one or more processors may be configured to transmit the plurality of coefficients via a physical downlink control channel communication.

Some aspects described herein relate to an apparatus for wireless communication at a UE. The apparatus may include one or more memories and one or more processors coupled to the one or more memories. The one or more processors may be configured to receive a physical downlink shared channel communication that includes a precoding data indication. The one or more processors may be configured to receive a physical downlink control channel communication that includes a plurality of coefficients. The one or more processors may be configured to generate a plurality of non-linearity approximation signals in accordance with the plurality of coefficients. The one or more processors may be configured to cancel the plurality of non-linearity approximation signals from the physical downlink shared channel communication.

Some aspects described herein relate to a non-transitory computer-readable medium that stores a set of instructions for wireless communication by a network node. The set of instructions, when executed by one or more processors of the network node, may cause the network node to apply a precoding operation to a downlink physical channel. The set of instructions, when executed by one or more processors of the network node, may cause the network node to obtain a plurality of coefficients associated with a non-linearity of the downlink physical channel in accordance with estimating a cross-correlation of a plurality of power delay profiles associated with the precoding operation. The set of instructions, when executed by one or more processors of the network node, may cause the network node to precode a physical downlink shared channel communication in accordance with a result of the precoding operation. The set of instructions, when executed by one or more processors of the network node, may cause the network node to transmit the plurality of coefficients via a physical downlink control channel communication.

Some aspects described herein relate to a non-transitory computer-readable medium that stores a set of instructions for wireless communication by a UE. The set of instructions, when executed by one or more processors of the UE, may cause the UE to receive a physical downlink shared channel communication that includes a precoding data indication. The set of instructions, when executed by one or more processors of the UE, may cause the UE to receive a physical downlink control channel communication that includes a plurality of coefficients. The set of instructions, when executed by one or more processors of the UE, may cause the UE to generate a plurality of non-linearity approximation signals in accordance with the plurality of coefficients. The set of instructions, when executed by one or more processors of the UE, may cause the UE to cancel the plurality of non-linearity approximation signals from the physical downlink shared channel communication.

Some aspects described herein relate to an apparatus for wireless communication. The apparatus may include means for applying a precoding operation to a downlink physical channel. The apparatus may include means for obtaining a plurality of coefficients associated with a non-linearity of the downlink physical channel in accordance with estimating a cross-correlation of a plurality of power delay profiles associated with the precoding operation. The apparatus may include means for precoding a physical downlink shared channel communication in accordance with a result of the precoding operation. The apparatus may include means for transmitting the plurality of coefficients via a physical downlink control channel communication.

Some aspects described herein relate to an apparatus for wireless communication. The apparatus may include means for receiving a physical downlink shared channel communication that includes a precoding data indication. The apparatus may include means for receiving a physical downlink control channel communication that includes a plurality of coefficients. The apparatus may include means for generating a plurality of non-linearity approximation signals in accordance with the plurality of coefficients. The apparatus may include means for canceling the plurality of non-linearity approximation signals from the physical downlink shared channel communication.

Aspects generally include a method, apparatus, system, computer program product, non-transitory computer-readable medium, user equipment, base station, network entity, network node, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
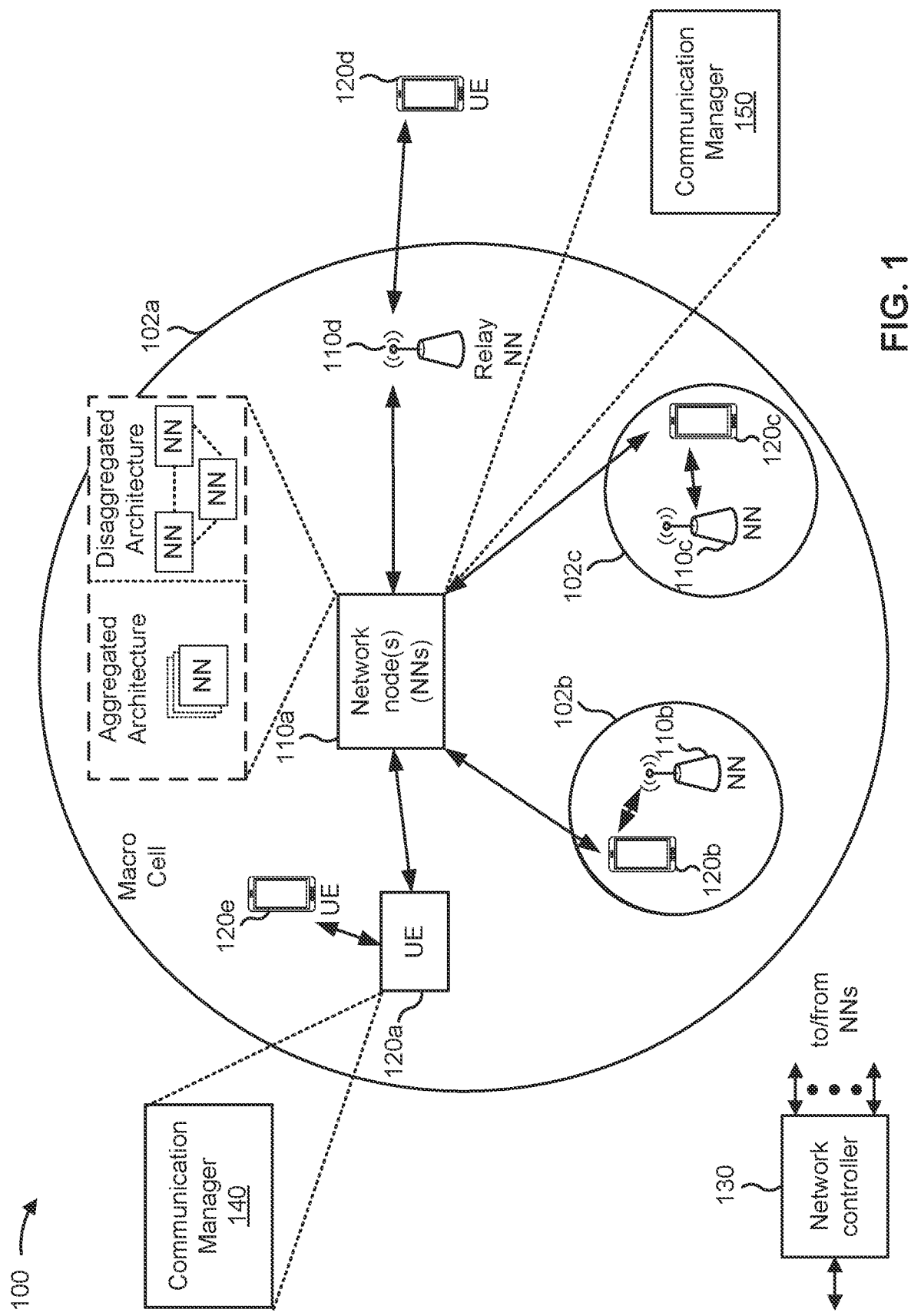
FIG. 1 is a diagram illustrating an example of a wireless network, in accordance with the present disclosure.

Network power saving and reduced user equipment (UE) power consumption are important goals in communication networks. Power amplifiers (PAs) may be one of the largest power consuming devices at a network device (such as a network node). In some cases, to reduce network power consumption, the network node may lower a power amplifier supply voltage while using less power backoff from a power amplifier maximal voltage. However, this may result in non-linear distortions to communication signals transmitted by the network node.

Non-linear distortions in communication signals may degrade a quality of the communication signals and may interfere with neighboring frequency bands. In some cases, digital post-distortion (DPoD) processing may be used to reduce these non-linear distortions and may improve network performance. Digital post-distortion processing may be performed at a receiving device and may be performed for each transmission antenna of a plurality of transmission antennas associated with a transmitting device (such as in a multiple-input multiple-output (MIMO) communication system). In some cases, digital post-distortion processing complexity may increase with the number of transmission antennas. This may result in increased UE power consumption due to the increased digital post-distortion processing that is needed to correct the non-linear distortions resulting from the increased number of transmission antennas. Additionally, this may result in a loss of bandwidth for data transmissions. For example, the UE and/or the network node may need to identify a large number of parameters, such as non-linearity coefficients and channel parameters (which may require an increased number of pilot signals), and/or may need to transmit these parameters over the channel (such as in the case of precoder coefficients), which may result in reduced bandwidth for transmitting data signals.

Various aspects relate generally to wireless communications. Some aspects more specifically relate to coefficient estimation for non-linearity cancellation. In some aspects, a UE may transmit, and a network node may receive, a sounding reference signal (SRS) or a demodulation reference signal (DMRS). The network node may estimate an uplink physical channel between the network node and the UE in accordance with the SRS or the DMRS, and may identify (e.g., derive) a downlink physical channel between the network node and the UE using a reciprocity characteristic between the downlink and uplink channels. The network node may apply a precoding operation to the downlink physical channel, estimate a cross-correlation of a plurality of power delay profiles associated with the precoding operation, and may obtain (e.g., generate) a plurality of coefficients associated with a non-linearity of the downlink physical channel in accordance with estimating the cross-correlation of the plurality of power delay profiles. In some aspects, the precoding operation may be a singular value decomposition (SVD) precoding operation. The network node may precode a physical downlink shared channel (PDSCH) communication in accordance with a result of the precoding operation, and may transmit, to the UE, a physical downlink control channel (PDCCH) communication that includes the plurality of coefficients. The UE may receive the plurality of coefficients from the network node, and may generate a plurality of non-linearity approximation signals in accordance with the plurality of coefficients. Additionally, the UE may cancel the plurality of non-linearity signals from the PDSCH communication.

Particular aspects of the subject matter described in this disclosure can be implemented to realize one or more of the following potential advantages. In some examples, by obtaining, at the network node, a plurality of coefficients associated with a non-linearity of a downlink physical channel between the network node and the UE, and transmitting the plurality of coefficients to the UE, the described techniques can be used to enable a calculation of non-linearity approximation signals at the UE. This may reduce a need for the network node to transmit the non-linearity approximation signals over-the-air, which may increase an available bandwidth for other data transmissions between the network node and the UE. Additionally, by calculating the non-linearity approximation signals at the UE, the described techniques can be used to cancel the non-linearities from the communications between the network node and the UE for any number of transmission antennas without (significantly) increasing UE power consumption or reducing available network bandwidth. These example advantages, among others, are described in more detail below.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a UE 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the network node 110 may include a communication manager 150. As described in more detail elsewhere herein, the communication manager 150 may apply a precoding operation to a downlink physical channel; obtain a plurality of coefficients associated with a non-linearity of the downlink physical channel in accordance with estimating a cross-correlation of a plurality of power delay profiles associated with the precoding operation; precode a physical downlink shared channel communication in accordance with a result of the precoding operation; and transmit the plurality of coefficients via a physical downlink control channel communication. Additionally, or alternatively, the communication manager 150 may perform one or more other operations described herein.

In some aspects, the UE 120 may include a communication manager 140. As described in more detail elsewhere herein, the communication manager 140 may receive a physical downlink shared channel communication that includes a precoding data indication; receive a physical downlink control channel communication that includes a plurality of coefficients; generate a plurality of non-linearity approximation signals in accordance with the plurality of coefficients; and cancel the plurality of non-linearity approximation signals from the physical downlink shared channel communication. Additionally, or alternatively, the communication manager 140 may perform one or more other operations described herein.

As indicated above, FIG. 1 is provided as an example. Other examples may differ from what is described with regard to FIG. 1.

Figure 2:
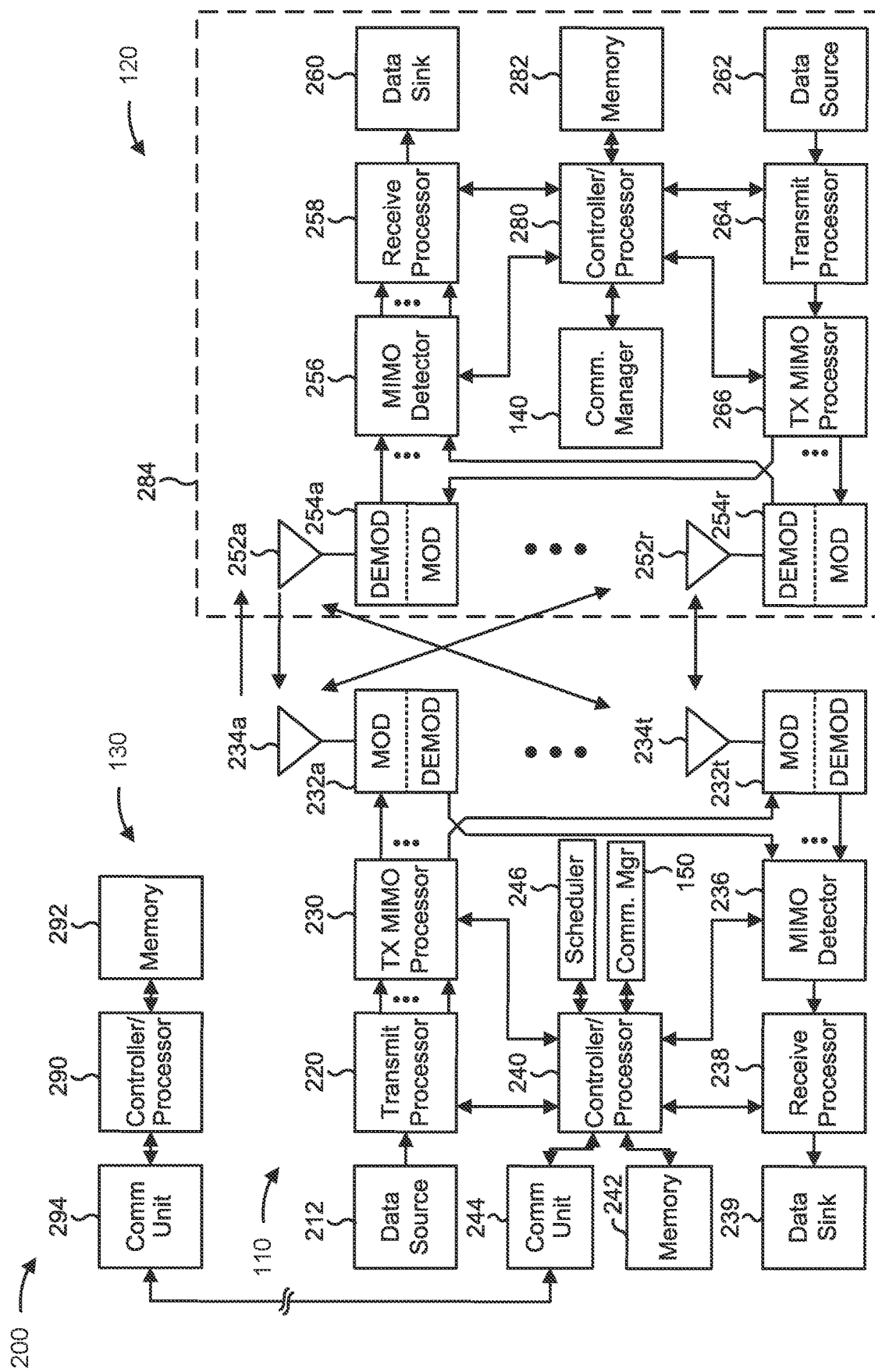
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t May transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-12).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-12).

The controller/processor 240 of the network node 110, the controller/processor 280 of the UE 120, and/or any other component(s) of FIG. 2 may perform one or more techniques associated with coefficient estimation for non-linearity cancellation, as described in more detail elsewhere herein. For example, the controller/processor 240 of the network node 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 900 of FIG. 9, process 1000 of FIG. 10, and/or other processes as described herein. In some examples, executing instructions May include running the instructions, converting the instructions, compiling the instructions, and/or interpreting the instructions, among other examples.

In some aspects, the network node 110 includes means for applying a precoding operation to a downlink physical channel; means for obtaining a plurality of coefficients associated with a non-linearity of the downlink physical channel in accordance with estimating a cross-correlation of a plurality of power delay profiles associated with the precoding operation; means for precoding a physical downlink shared channel communication in accordance with a result of the precoding operation; and/or means for transmitting the plurality of coefficients via a physical downlink control channel communication. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the UE 120 includes means for receiving a physical downlink shared channel communication that includes a precoding data indication; means for receiving a physical downlink control channel communication that includes a plurality of coefficients; means for generating a plurality of non-linearity approximation signals in accordance with the plurality of coefficients; and/or means for cancelling the plurality of non-linearity approximation signals from the physical downlink shared channel communication. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
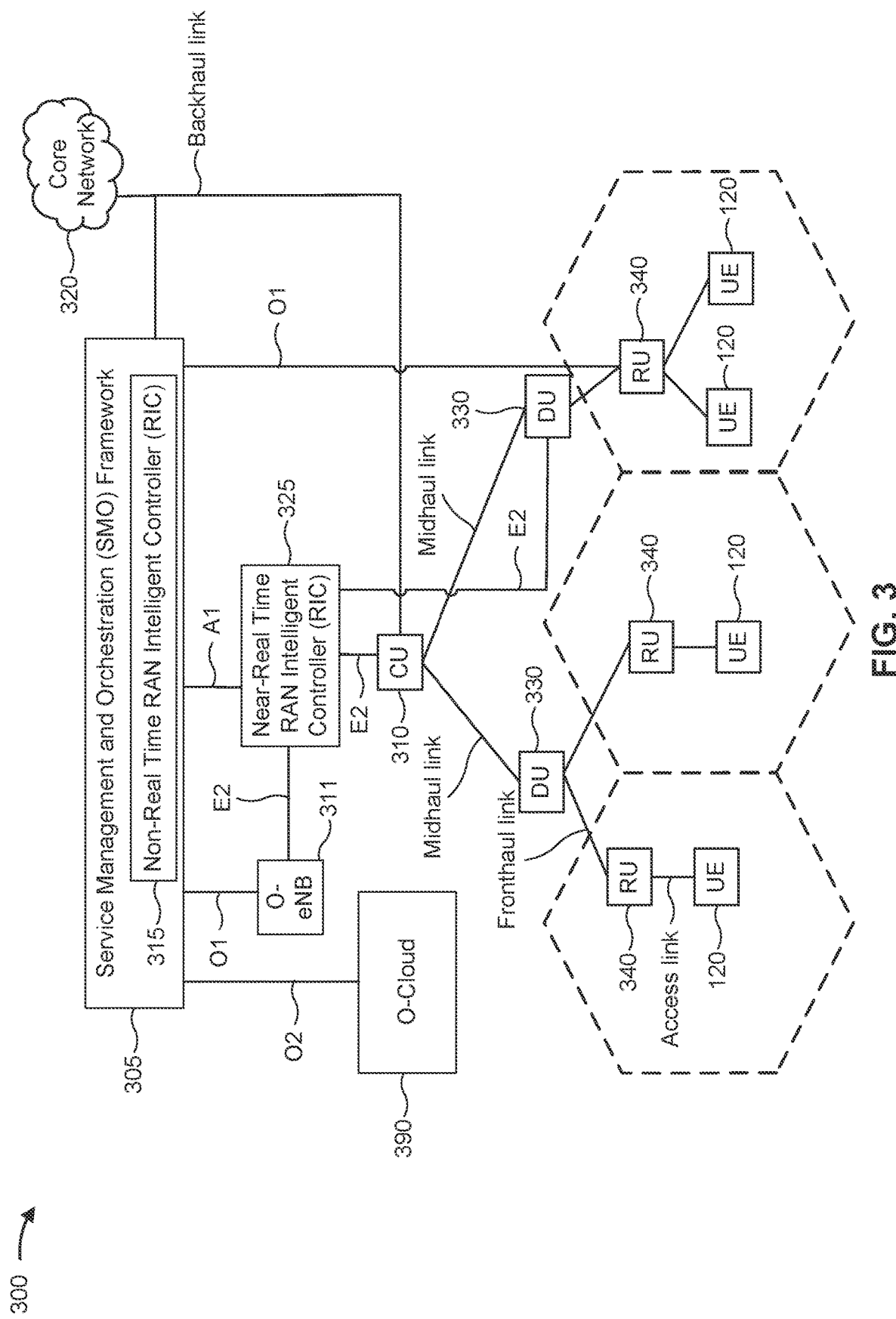
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
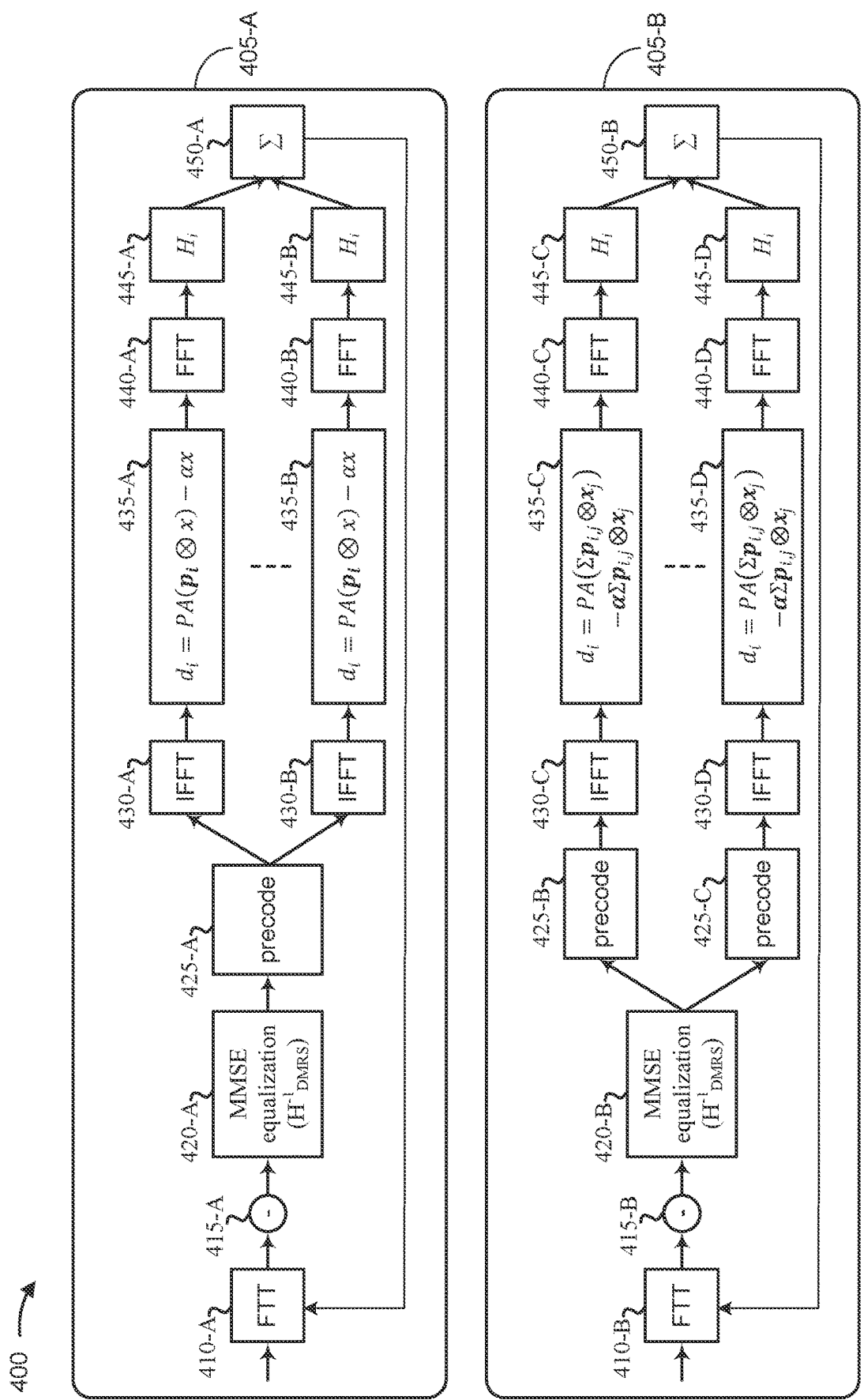
FIG. 4 is a diagram illustrating an example of non-linearities in a communication system that includes multiple antennas, in accordance with the present disclosure.

FIG. 4 is a diagram illustrating an example of non-linearities in a communication system that includes multiple antennas, in accordance with the present disclosure. In some examples, the non-linearities may be calculated by a DPoD model 400. The DPoD model 400 may implement aspects of the wireless communications system 100 or may be implemented by aspects of the wireless communications system 100. For example, a network node 110 (e.g., a transmitter) may transmit signals at powers close to a PA compression point. This may increase power efficiency. However, the signals output from a PA may be distorted due to non-linearities associated with the PA. In such cases, a UE 120 (e.g., a receiver) may utilize a DPoD model 405-a or a DPoD model 405-b (variations of a DPoD model 400) to reconstruct and subtract non-linearities from the received signals in an iterative manner.

Wireless devices (e.g., network nodes 110, UEs 120, and other transmitters and receivers) may use DPoD techniques for use cases of varying complexity. For example, as the wireless devices may use DPoD techniques to compensate for non-linearities in a PA, the DPoD techniques may become more complex with multiple PAs and multiple corresponding channels. Network nodes 110 and UEs 120 may use DPoD techniques for low-complexity cases such as for single-layer transmissions with no precoding and a single transmit antenna (which may be associated with an arbitrary PA model). Low-complexity use cases may also include single-layer transmissions with wideband precoding (e.g., scalar per antenna, $p_i$, phase only change) and any quantity of transmit antennas. Such cases may be associated with limited PA models (e.g., memory-less, identical, amplitude modulation (AM) or AM-phase modulation (PM) models with non-linearities dominated by $|x|^2 x$ applicable for lightly-compressed Pas, where x represents time-varying data) and may be applicable to demodulation reference signal (DMRS)-based channels. Low-complexity use cases may also include and single user MIMO (SU-MIMO) (multiple-layer) transmissions with no precoding and a quantity $N_{layers}$ transmit antennas (e.g., $N_{Tx}=N_{Rx}=N_{layers}$), which may be associated with an arbitrary PA model and which may assume a minimum mean-squared error (MMSE) equalization acceptable in low antenna correlation conditions.

Additionally, or alternatively, existing DPoD techniques may support some moderately-complex use cases including single-layer transmissions with frequency selective precoding and one transmit antenna (which may be associated with an arbitrary PA model and may require some precoding knowledge at the UE 120) and SU-MIMO transmissions with wideband precoding or frequency selective precoding and a quantity $N_{layers}$ transmit antennas (e.g., $N_{Tx}=N_{Rx}=N_{layers}$), which may be associated with an arbitrary PA model, require some precoding knowledge, and require a raw channel estimation with $H_{raw}=H_{DMRS}P^{-1}$.

Some use cases may be overly complex for current DPoD techniques. For example, single-layer transmissions with frequency selective precoding and many transmit antennas (e.g., in a beamforming scenario) and SU-MIMO transmissions with wideband or frequency selective precoding and many transmit antennas may be high complexity use cases (associated with an arbitrary PA model) that require precoding knowledge and data-aided raw channel estimation per antenna. In such examples, a network node 110 may transmit a signal to a UE 120, and the signal may include some non-linear components due to being processed through a non-linear PA. For a single-layer, multiple transmit antenna, and frequency selective precoding use case (e.g., a high-complexity use case), the UE 120 may use the DPoD model 405-a to subtract the non-linearities from the received signal.

A received signal $y_j$, which may include linear and non-linear components, may be a time-domain signal represented in Equation 1.

$$y_j = \Sigma_i h_{i,j} \otimes PA(p_i \otimes x) = \Sigma_i h_{i,j} \otimes (\alpha(p_i \otimes x) + h_{i,j} \otimes d_i(p_i \otimes x)) = h_{DMRS,j} \otimes x + \Sigma_i h_{i,j} \otimes d_i(p_i \otimes x) \quad (1)$$

In Equation 1, x may represent time-varying data (which is input to a fast Fourier transform (FFT) 410-a at the beginning of the DPoD model 405-a), $p_i$ may represent a frequency-selective precoding in the time domain for transmit antenna i, PA may represent a non-linear function or component corresponding to the PA used by the network node 110, and $h_{i,j}$ may represent a communication channel between an ith receive antenna and a jth transmit antenna. The received signal $y_j$ may be the summation of linear components of data from each transmit antenna. Term $h_{DMRS,j} \otimes x$ may represent linear components of the received signal, where $h_{DMRS,j}$ may represent a precoded channel that may be estimated based at least in part on DMRSs of the channel. The term $\Sigma_i h_{i,j} \otimes d_i(p_i \otimes x)$ may represent a non-linear components (e.g., non-linear distortions) of the received signal. To remove the non-linear components from the received signal such that the UE 120 is able to process it, the UE 120 may use the DPoD model 405-*a* to replicate the non-linear components and subtract them from the received signal.

Using the DPoD model 405-*a*, the UE 120 may receive a time-domain signal with non-linearities via a receive antenna and convert it to the frequency domain via the FFT 410-*a*. The UE 120 may apply the FFT 410-*a* per receive antenna. The UE 120 may use a subtraction 415-*a* to subtract some non-linear components from the received signal. As the UE 120 may lack knowledge of most of the non-linearities during a first iteration of the DPoD model 405-*a*, the UE 120 may apply an MMSE equalization (e.g., $H^{-1}{}_{DMRS}$) 420-*a* to remove channel noise from the signal, resulting in an estimate of the data carried in the received signal.

To replicate the non-linear interference (such that it may be subtracted from the received signal), the UE 120 may apply a precoding 425-*a* to precode the data of the received signal, and apply an inverse FFT (IFFT) 430 to the precoded data to convert the data back to the time domain. After precoding the data, the UE 120 may split its processing of the data per transmit antenna, such that the UE 120 may apply an IFFT 430-*a* to the data for a first transmit antenna, an IFFT 430-*b* to the data for a second transmit antenna, and so on. For each transmit antenna i, the UE 120 may the input to a mathematical model 435 of the PA to calculate the non-linear distortion of the data, $d_i$. For example, the UE 120 may apply a mathematical model 435-*a* for the first transmit antenna, a mathematical model 435-*b* for the second transmit antenna, and so on. The mathematical model may calculate $d_i$ as $d_i = PA(p_i \otimes x) - \alpha x$, where PA may represent a non-linear function or component of the PA, $p_i$ may represent a frequency-selective precoding represented in the time domain, x may represent the data in the time domain (e.g., time-varying data), and a may represent a gain of the linear component of the PA response. That is, each PA response may be decomposed as PA $(x) = \alpha x + d$ (e.g., a Bussgang decomposition), where d may represent a non-linear distortion and a may represent a linear gain (e.g., a Bussgang coefficient). Based at least in part on calculating or estimating $d_i$, the UE 120 may apply an FFT 440 to the data for each transmit antenna (e.g., an FFT 440-*a* for the first transmit antenna, an FFT 440-*b* for the second transmit antenna, and so on). In addition, the UE 120 may multiply the data per transmit antenna by a frequency domain channel $H_i$ 445 (e.g., a channel $H_i$ 445-*a* for the first transmit antenna, a channel $H_i$ 445-*b* for the second transmit antenna, and so on), which may be unknown.

The UE 120 may sum the non-linearities calculated for each transmit antenna using a summation 450-*a* to obtain a non-linear interference, and then the UE 120 may subtract the sum from the original received signal. This may result in a cleaner, more linear received signal, such that when the UE 120 repeats these steps in subsequent iterations, the estimates of the non-linearities may improve. As such, the UE 120 may perform iterations of the DPoD model 405-*a* until the resulting received signal includes only a linear component (or as few non-linearities as possible), which the UE 120 may process.

However, the DPoD model 405-*a* may have some limitations. For example, because the IFFTs 430, the mathematical models 435, the FFTs 440, and the channels $H_i$ 445 are applied per transmit antenna, the complexity of the DPoD model 405-*a* may increase proportionally with the quantity of transmit antennas. In addition, because of the term $h_{DMRS,j}$ of Equation 1 (corresponding to the signal that is input to the DPoD model 405-*a*), the UE 120 may be required to have some knowledge of channel precoding $p_i$ per antenna, which may result in the transmitted communicating excessive side information to the UE 120. The channel components of Equation 1 and the DPoD model 405-*a* may also require a raw channel estimation (before precoding and per antenna), which may be unavailable at the UE 120.

Alternatively, for a multiple-layer, multiple transmit antenna, and frequency selective precoding use case (e.g., a high-complexity use case), the UE 120 may use the DPoD model 405-*b* to subtract the non-linearities from the received signal $y_j$, which may be represented as a time-domain signal as shown in Equation 2.

$$y_r = \Sigma_i h_{i,r} \otimes PA(\Sigma p_{i,j} \otimes x_j) = \Sigma_i h_{i,r} \otimes (\alpha(\Sigma_j p_{i,j} \otimes x_j) + d_i(\Sigma_j p_{i,j} \otimes x_j)) = \Sigma_j h_{DMRS,r} \otimes x_j + \Sigma_i h_{i,r} \otimes d_i(\Sigma_j p_{i,j} \otimes x_j) \quad (2)$$

In Equation 2, $x_j$ may represent time-varying data received by a receive antenna j (which is input to an FFT 410-*b* at the beginning of the DPoD model 405-*b*), $p_{i,j}$ may represent a frequency-selective precoding in the time domain for transmit antenna i and a receive antenna j, PA may represent a non-linear function or component corresponding to the PA used by the network node 110, and $h_{i,r}$ may represent a communication channel between a receive antenna i and a transmit antenna r. The received signal $y_r$ may be the summation of linear components of data from each transmit antenna. The term $\Sigma_j h_{DMRS,r} \otimes x_j$ may represent linear components of the received signal, where $h_{DMRS,r}$ may represent a precoded channel that may be estimated based at least in part on DMRSs of the channel. The term $\Sigma_i h_{i,r} \otimes d_i (\Sigma_j p_{i,j} \otimes x_j)$ may represent a non-linear components (e.g., non-linear distortions) of the received signal. To remove the non-linear components from the received signal such that the UE 120 is able to process the received signal, the UE 120 may use the DPoD model 405-*b* to replicate the non-linear components and subtract them from the received signal.

Using the DPoD model 405-*b*, the UE 120 may receive a time-domain signal with non-linearities via a receive antenna and convert it to the frequency domain via an FFT 410-*b*. The UE 120 may apply the FFT 410-*b* per receive antenna. The UE 120 may use a subtraction 415-*b* to subtract some non-linear components from the received signal. As the UE 120 may lack knowledge of most of the non-linearities during a first iteration of the DPoD model 405-*b*, the UE 120 may apply an MMSE equalization (e.g., $H^{-1}{}_{DMRS}$) 420-*b* to remove channel noise from the signal, resulting in an estimate of the data carried in the received signal.

To replicate the non-linear interference (such that it may be subtracted from the received signal), the UE 120 may first apply a precoding 425 to precode the data of the received signal. At this point, the UE 120 may split its processing of the data per transmit antenna, such that the UE 120 may apply a precoding 425-*b* to a first transmit antenna, a precoding 425-*c* to a second transmit antenna, and so on. In addition, the UE 120 may apply an IFFT 430 to the precoded data per transmit antenna to convert the data back to the time domain (e.g., an IFFT 430-c to the data for a first transmit antenna, an IFFT 430-d to the data for a second transmit antenna, and so on). For each transmit antenna i, the UE 120 may the input to a mathematical model 435 of the PA to calculate the non-linear distortion of the data, $d_i$. For example, the UE 120 may apply a mathematical model 435-c for the first transmit antenna, a mathematical model 435-d for the second transmit antenna, and so on. The mathematical model may calculate $d_i$ as $d_i = PA(\Sigma p_{i,j} \otimes x_j) - \alpha \Sigma p_{i,j} \otimes x_j$, where PA may represent a non-linear function or component of the PA, $p_{i,j}$ may represent a frequency-selective precoding represented in the time domain, $x_j$ may represent the data in the time domain (e.g., time-varying data), and a may represent a gain of the linear component of the PA response. That is, each PA response may be decomposed as $PA(x) = \alpha x + d$, where d may represent a non-linear distortion and $\alpha$ may represent a linear gain. Based at least in part on calculating or estimating $d_i$, the UE 120 may apply an FFT 440 to the data for each transmit antenna (e.g., an FFT 440-c for the first transmit antenna, an FFT 440-d for the second transmit antenna, and so on). In addition, the UE 120 may multiply the data per transmit antenna by a frequency domain channel $H_i$ 445 (e.g., a channel $H_i$ 445-c for the first transmit antenna, a channel $H_i$ 445-d for the second transmit antenna, and so on), which may be unknown.

The UE 120 may sum the non-linearities calculated for each transmit antenna using a summation 450-b to obtain a non-linear interference, and then the UE 120 may subtract the sum from the original received signal. This may result in a cleaner, more linear received signal, such that when the UE 120 repeats these steps in subsequent iterations, the estimates of the non-linearities may improve. As such, the UE 120 may perform iterations of the DPoD model 405-b until the resulting received signal includes only a linear component (or as few non-linearities as possible), which the UE 120 may process. However, the DPoD model 405-b may have some limitations similar to that of the DPoD model 405-a. For example, because the precoding 425, the IFFTs 430, the mathematical models 435, the FFTs 440, and the channels $H_i$ 445 are applied per transmit antenna, the complexity of the DPoD model 405-b may increase proportionally with the quantity of transmit antennas. In addition, the DPoD model 405-b may require the UE 120 to have knowledge of precoders or a precoding rule used by the network node 110 per transmit antenna and the DPoD model 405-b may require a raw channel estimation (before the precoding and per transmit antenna).

To overcome the limitations of the DPoD models 405, transmitters and receivers may utilize lower-complexity DPoD models for single layer transmissions. Processing loads of such DPoD models may be independent of a quantity of transmit antennas and instead may rely on a quantity of layers, which may reduce complexity. In addition, such DPoD models may not require the UE 120 to have knowledge of precoders or a precoding rule the network node 110 used or raw channel information (e.g., information about the channel before precoding).

Instead of the processing depicted in the DPoD model 405-a and the DPoD model 405-b, lower-complexity DPoD models may involve calculating an expected interference (e.g., non-linearities in the received signal) instead of an exact interference. That is, as the quantity of transmit antennas at the network node 110 increases, the interference or non-linearities may approach an average or fixed value, such that the UE 120 may rely on the expected interference assuming that the quantity of transmit antennas is large. This may allow the UE 120 to replicate and remove most of the interference in a simpler way without knowing information about the un-coded channel and the precoding. In some examples, the UE 120 may calculate the expected interference at a time t as $E[I(t)]$ as $E[I(t)] = \Sigma |x(t+n)|^2 x(t) B(n)$, where x may represent a time-domain signal representative of data, t may represent an index in time, n may represent a sample, and $B(n)$ may represent a coefficient (also referred to herein as a b-coefficient) which be applied to identify and remove the non-linearities at the UE 120. In such cases, the network node 110 may calculate and signal $B(n)$ to the UE 120. $B(n)$ may depend on a quantity of receive antennas at the UE 120, a quantity of transmit antennas at the network node 110, a precoding rule (e.g., singular value decomposition (SVD)), precoding from a codebook, random precoding, etc.), a correlation between antennas, a power delay profile (PDP) associated with the communication channel, or any combination thereof. That is, $B(n)$ may depend on long-term factors of the channel, such as the PDP, which the UE 120 may know or calculate in advance, thus, removing the process of estimating the channel per transmit antenna.

Using the estimated interference $E[I(t)]$ (and based at least in part on the b-coefficients $B(n)$), the UE 120 may perform a DPoD procedure by replicating and cancelling an expected non-linear interference from a received signal in the time-domain, applying an FFT to convert the signal to the frequency domain, perform an MMSE equalization (e.g., $H^{-1}_{DMRS}$) to remove channel noise from the signal, convert the signal back to the time domain by applying an IFFT, and use the modified signal to calculate $E[I(t)]$ using b-coefficients signaled to the UE 120 by the network entity. The UE 120 may subtract the expected interference $E[I(t)]$ from the received signal and repeat the DPoD process iteratively to further improve the linearity of the received signal.

In some examples, the UE 120 may use a procedure for numeric DPoD interference cancellation to calculate the average non-linear interference (e.g., an ergodic average) instead of an expected or actual interference (e.g., an expectation calculation). In such cases, the network node 110 may generate one or more random channels with a known PDP or a mixture of known PDPs. The network node 110 may generate a precoding (using a precoding rule) that is optimized per channel realization. In some cases, the network node 110 may generate a set of random data and create N kernels, where an nth kernel may be of the form $K(n) = |x(t+n)|^2 x(t)$, where $K(n)$ may represent the nth kernel, x may represent the data, and t may represent a time. The network node 110 may use other kernels for more complex channel models, interference terms, or a combination thereof.

In some examples, the UE 120 may calculate the interference $I(x)$ (e.g., for a single layer), which may be represented as $I(x) = \Sigma_i \Sigma_m h_i(m) \Sigma_{n_1} p_i(n_1) x(t-n_1-m) \Sigma_{n_2} p_i(n_2) x(t-n_2-m) \Sigma_{n_3} p_i^*(n_3) x^*(t-n_3-m)$, where x may represent the data, $p_i$ may represent a precoding, t may represent a time index, and n and m may represent a layer. The UE 120 may solve a least squares regression to identify coefficients b associated with each kernel using $b = \arg\min |[K(0) \ldots K(N-1)]b - I(x)|^2$, and the interference may be calculated as $I(x) = \Sigma_n K(n) b(n)$. The coefficients b may enable the linear combination of the kernels to be used in the least squares calculation to calculate the interference. However, this procedure requires the network entity to signal PDPs for corresponding channels, a precoding rule, and the set of kernels for use in the interference calculation. This may result in high complexity and requires the UE 120 to have knowledge of the precoding rule, which the network node 110 may rather keep proprietary (and refrain from sharing).

Such DPoD models that are based at least in part on calculating the expected non-linear interference E[I(t)] may introduce additional limitations. For example, the analytical calculation of B(n) may be difficult and intractable in many cases, and the numeric calculation of B(n) may be a highly-complex calculation that may be challenging for the UE 120. For example, the calculation of B(n) may require matrix inversion of large matrices, and may occur each time a PDP associated with the channel changes, which may be on the order of every few hundreds of milliseconds. In addition, the B(n) calculation may require knowledge of a precoding rule used by the network node 110, however, in many cases, the network node 110 may refrain from sharing the precoding rule with the UE 120.

As indicated above, FIG. 4 is provided as an example. Other examples may differ from what is described with regard to FIG. 4.

Figure 5:
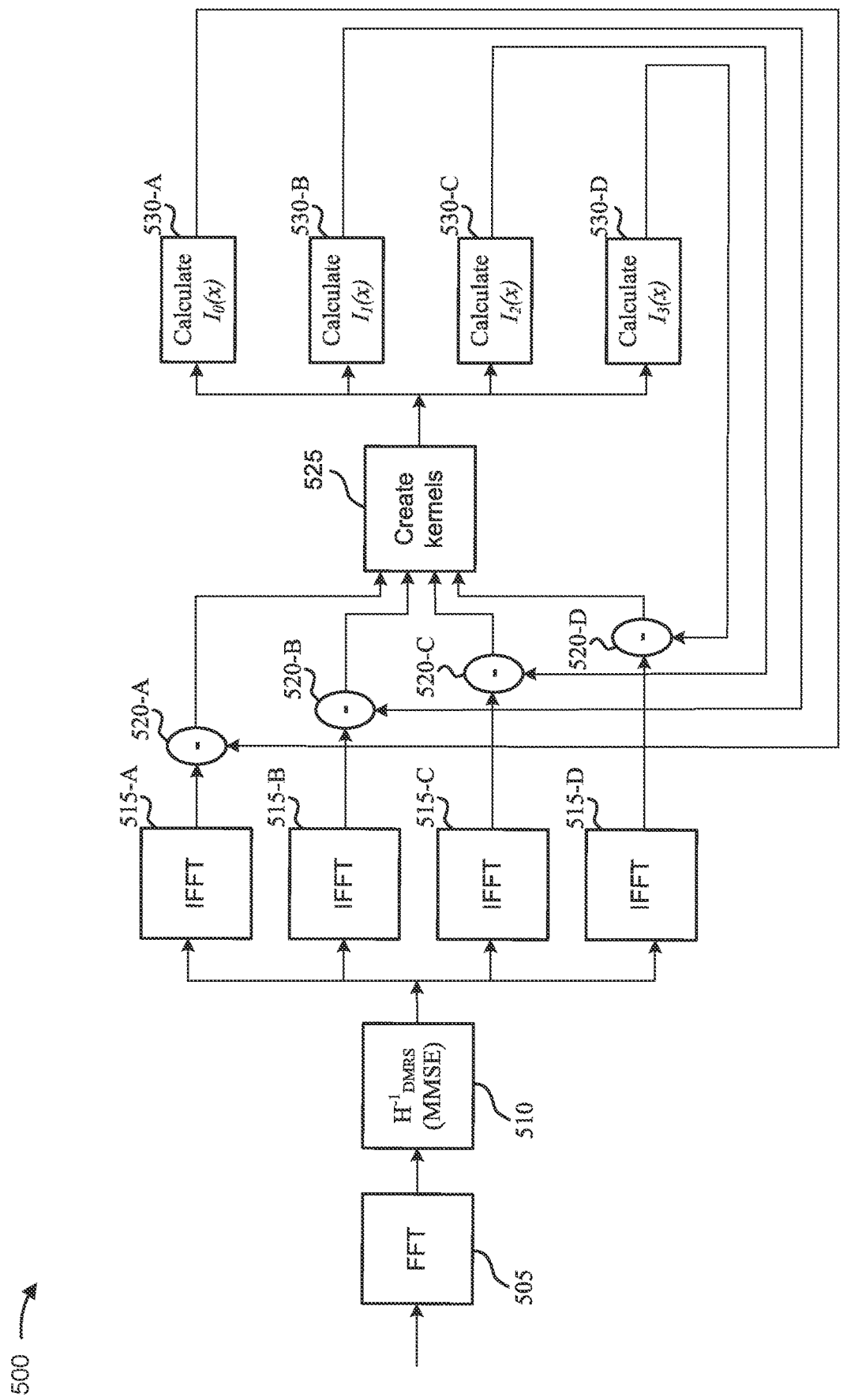
FIG. 5 is a diagram illustrating an example of non-linearity estimation using matrix operations, in accordance with the present disclosure.

FIG. 5 is a diagram illustrating an example of non-linearity estimation using matrix operations, in accordance with the present disclosure. In some examples, the non-linearity estimation may be performed by a DPoD model 500. The DPoD model 500 may implement aspects of the wireless communications system 100 and/or the DPoD model 200, or may be implemented by aspects of the wireless communications system 100, and/or the DPoD model 200. For example, a UE 120 (e.g., a receiver) may use the DPoD model 500 to remove transmitter-induced non-linear components of received signals.

A UE 120 may calculate a set of b-coefficients B(n) for use in a DPoD procedure. In the example of FIG. 5, the UE 120 may use four receive antennas and four layers. The UE 120 may apply an FFT 505 to a received signal to convert the data to the frequency domain. In addition, the UE 120 may apply an MMSE equalization ($H^{-1}_{DMRS}$) 510 to remove channel noise from the signal, resulting in an estimate of the data carried in the received signal. Then, the UE 120 may apply an IFFT 515 to the data for each layer m to convert the data back to the time domain. For example, the UE 120 may apply an IFFT 515-*a* for a first receive antenna, an IFFT 515-*b* for a second receive antenna, an IFFT 515-*c* for a third receive antenna, and an IFFT 515-*d* for a fourth receive antenna. The time-domain data for each receive antenna may be used to create kernels 525, where kernel types for calculating the mth layer may be represented as: $|x_0(t+l)|^2 x_m(t)$, $|x_1(t+l)|^2 x_m(t)$, $|x_2(t+l)|^2 x_m(t)$, $|x_3(t+l)|^2 x_m(t)$ for all l, where l may represent an index of a kernel. For such kernels, l may have any value in a range of an FFT side, for example, 0 to N−1, where N may represent the FFT size. In the examples described herein, l may have all values, such that there may be 4N kernels (4 kernels in the equation per value of l).

After the equalization $H^{-1}_{DMRS}$ and using the kernels 525 and a set of b-coefficients, the UE 120 may calculate an average interference $I_i(x)$ 530 for each layer. For example, the UE 120 may calculate an average interference $I_0(x)$ 530-*a* for a first layer, an average interference $I_1(x)$ 530-*b* for a second layer, an average interference $I_2(x)$ 530-*c* for a third layer, and an average interference $I_6(x)$ 530-*d* for a fourth layer. The UE 120 may subtract the average interference $I_i(x)$ 530 from the received signal for each corresponding receive antenna using a subtraction 520 (e.g., a subtraction 520-*a*, 520-*b*, 520-*c*, and 520-*d* for the first receive antenna, the second receive antenna, the third receive antenna, and the fourth receive antenna, respectively), and thus may reduce the transmitter-induced non-linear component of the received signal that is received via each receive antenna. For example, using the DPoD model 500, the UE 120 may cancel approximately 11.5 dB to 14 dB from the interference for 50% of channel realizations. The UE 120 may use the DPoD model 500 iteratively to further improve the linearity of the received signal.

As indicated above, FIG. 5 is provided as an example. Other examples may differ from what is described with regard to FIG. 5.

Figure 6:
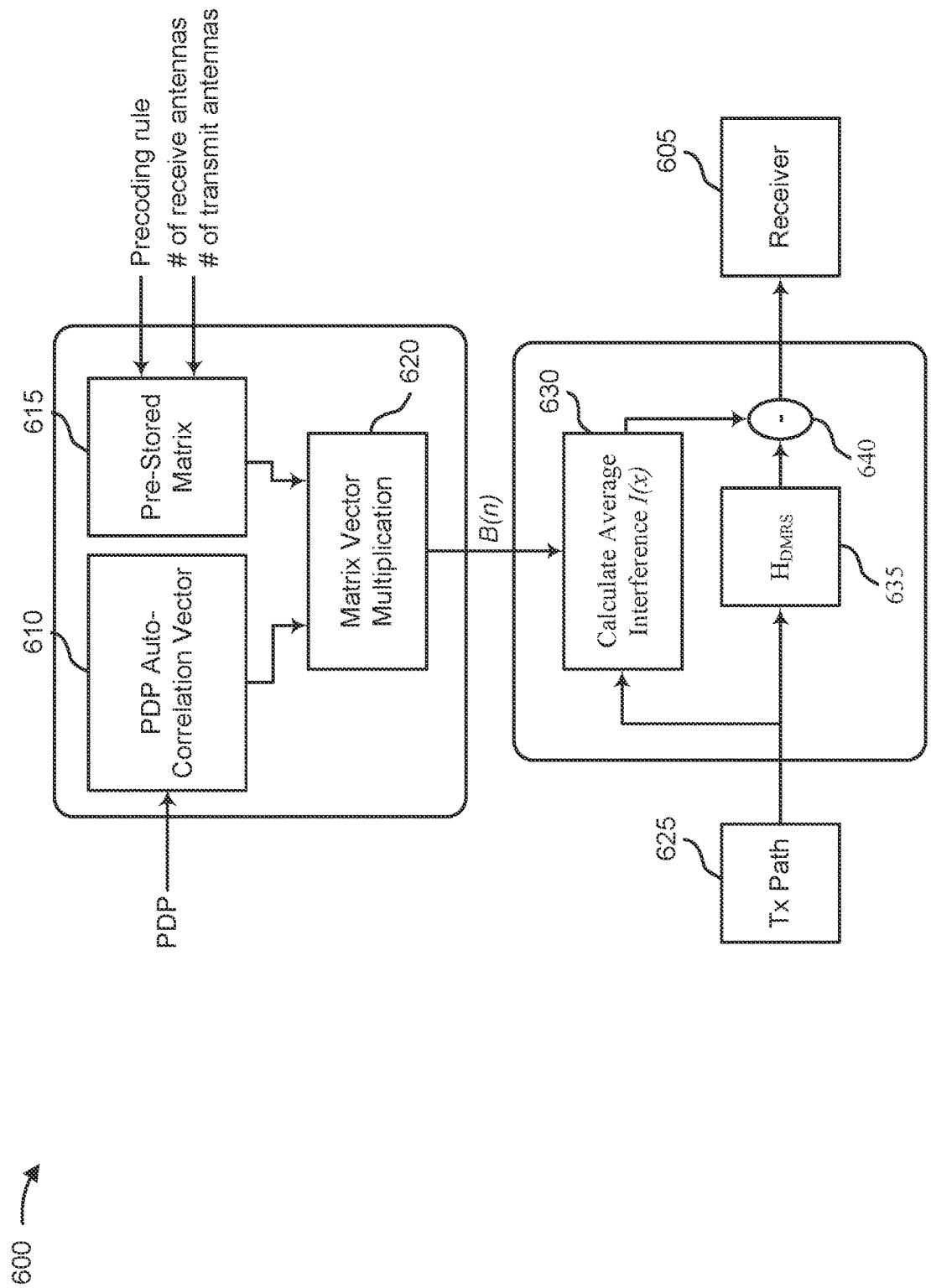
FIG. 6 is a diagram illustrating an example of components configured to perform non-linearity estimation using matrix operations, in accordance with the present disclosure.

FIG. 6 is a diagram illustrating an example of components 600 configured to perform non-linearity estimation using matrix operations, in accordance with the present disclosure. In some examples, components 600 configured to perform the coefficient calculation may implement aspects of the wireless communications system 100 or may be implemented by aspects of the wireless communications system 100. For example, a UE 120 (e.g., a receiver 605) may use the coefficient estimation to identify one or more b-coefficients (e.g., B(n)) for use in a DPoD procedure to reduce non-linearities of a received signal.

The UE 120 may receive a signal from a network node 110 that includes a non-linear component based at least in part on the network node 110 using a non-linear PA. To reduce the transmitter-induced non-linearity component of the received signal, the UE 120 may receive an indication to apply a DPoD procedure to the received signal. For the case of SVD precoding and a single receive antenna (at the UE 120), the vector b (n) representing b-coefficients may depend on a linear combination of PDP autocorrelation values for a PDP of a communication channel associated with the received signal. That is, $b(n)=2\Sigma_{n_1}\Sigma_{n_2}\sigma^2(n_1)\sigma^2(n_2)\delta(n_1-n_2=n)+\sigma^4(n)\delta(n_1=n_2=n=0)$. Use cases with more complex receive antenna diversity may follow the same calculation with different linear combination coefficients. Thus, to calculate the b-vector B(n), the UE 120 or the network node 110 may calculate a PDP autocorrelation vector 610 (e.g., one or more autocorrelation values for a PDP of the communication channel associated with the received signal), and multiply the PDP autocorrelation vector 610 by a pre-stored matrix 615 (e.g., a fixed matrix) using matrix vector multiplication 620. The pre-stored matrix 615, which may be determined by the network node 110, may be a function of a precoding rule used by the network node 110, a quantity of receive antennas (at the UE 120), a quantity of transmit antennas (at the network node 110), a network entity antenna correlation and topology independent of the PDP, or any combination thereof.

In some examples, the network node 110 may determine the pre-stored matrix 615 by generating multiple PDPs for one or more communication channels and calculating a b-vector for each of the PDPs using a numerical method and least-squares fitting of the b-vector to the PDP autocorrelation vector 610. The network node 110 may perform this process once, and the network node 110 may store different pre-stored matrices 615 (e.g., associated with different quantities of receive antennas, different quantities of transmit antennas, different precoding types). In this way, the network node 110 and the UE 120 may refrain from performing a high-complexity calculation of the b-vector each time a PDP changes, and the network node 110 may signal the pre-stored matrix 615 to the UE 120 without explicitly indicating the precoding rule itself.

In some examples, the UE 120 (e.g., the receiver 605) may measure and signal the PDP autocorrelation vector 610 to the network node 110 such that the network node 110 may calculate the b-coefficients. In some examples, the UE 120 may determine the PDP autocorrelation vector 610 based at least in part on channel state information (CSI) reference signal (CSI-RS) measurements, where the network node 110 may dedicate some CSI-RS resources for the PDP autocorrelation measurements. That is, the UE 120 may determine the PDP autocorrelation vector 610 based at least in part on measurements of one or more reference signals transmitted by the network node 110. In some examples, the PDP autocorrelation vector 610 may be based at least in part on additional or new reference signals to allow a greater time span estimation of the PDP.

In some cases, the network node 110 may determine which transmit antennas (or a mixture of one or more antennas) to use for transmitting the CSI-RSs such that the PDP autocorrelation vector 610 reported by the UE 120 may be representative of the communication channel. In such cases, the network node 110 may transmit, to the UE 120, information indicative of one or more transmit antennas associated with the CSI-RSs or other reference signals, and the UE 120 may determine the PDP autocorrelation vector 610 based at least in part on the information. The UE 120 may report (to the network node 110 for use in calculating the b-coefficients) a single PDP autocorrelation vector 610 that is averaged over all CSI-RS ports dedicated for the DPoD procedure. Alternatively, the UE 120 may report multiple PDP autocorrelation vectors 610, in which case the network node 110 may specify which transmit antenna groups are to be included in the averaging process for each one of the reported PDP autocorrelation vectors 610. That is, the information indicative of the one or more transmit antennas may indicate an organization of the one or more transmit antennas into one or more transmit antenna groups, where the UE 120 may determine a PDP autocorrelation vector 610 (or at least a PDP autocorrelation value) for each of the one or more transmit antenna groups. The UE 120 may transmit a report indicative of the one or more PDP autocorrelation vectors 610 in accordance with a periodic schedule (e.g., according to a periodicity), a semi-persistent schedule (e.g., semi-persistently), or an aperiodic schedule (e.g., irregularly). In such cases, the network node 110 may determine the one or more PDP autocorrelation values based at least in part on the PDP autocorrelation vector 610 indicated in the report.

In some examples, the network node 110 may determine the b-coefficients B(n) in response to the report that indicates the PDP autocorrelation vector 610. In some cases, the network node 110 may transmit information to the UE 120 indicating the set of b-coefficients for use by the UE 120 in the DPoD procedure. That is, the network node 110 may determine the b-coefficients based at least in part on the one or more autocorrelation values in the PDP autocorrelation vector 610 and the pre-stored matrix 615, and the network node 110 may indicate the b-coefficients to the UE 120 such that the UE 120 may use the b-coefficients in the DPoD procedure.

Alternatively, if the UE 120 is to calculate the b-coefficients B(n), the network node 110 may signal the pre-stored matrix 615 to the UE 120. For example, the network node 110 may transmit an RRC message (e.g., a first control message) indicating the pre-stored matrix 615. The pre-stored matrix 615 may be based at least in part on a precoding rule used by the network node 110, a quantity of receive antennas, a quantity of transmit antennas, or a combination thereof, and the UE 120 may use the pre-stored matrix 615 with the one or more PDP autocorrelation vectors 610 to identify the set of b-coefficients. The network node 110 may transmit the RRC message according to a period or aperiodic schedule.

Additionally, or alternatively, the network node 110 may indicate multiple pre-stored matrices in the RRC message and indicate a selection of a pre-stored matrix 615 based at least in part on rules and corresponding indices in a MAC control element (MAC-CE) or downlink control information (DCI) (e.g., a second control message). That is, the UE 120 may receive a first control message (e.g., an RRC message) that indicates a set of multiple pre-stored matrices and a second control message (e.g., DCI or a MAC-CE) that indicates an index that selects (indicates) a pre-stored matrix 615 of the set of multiple pre-stored matrices. By signaling the pre-stored matrix 615, in which the precoding rule used by the network node 110 is implicitly embedded, the network node 110 may refrain from explicitly indicating the precoding rule to the UE 120, which may be proprietary information. In addition, indicating the pre-stored matrix 615 allows the network node 110 to refrain from indicating a quantity of transmit antennas (and their correlation or topology), which may be proprietary information.

In some examples, the UE 120 may signal a quantity of receive antennas it uses such that the network node 110 may select and signal the correct pre-stored matrix 615 to the UE 120. That is, the UE 120 may transmit an uplink message that indicates the quantity of receive antennas used by the UE 120 to receive the received signal, where the RRC message indicates the pre-stored matrix 615 based at least in part on the quantity of receive antennas. In some cases, the uplink message may also indicate an antenna correlation, which the network node 110 may consider when selecting the pre-stored matrix 615. In some examples, the UE 120 may signal (via an uplink message) multiple quantities of receive antennas and receive multiple pre-stored matrices from the network node 110 in response (via a control message). That is, the UE 120 may receive a control message that indicates multiple pre-stored matrices, each of the multiple pre-stored matrices usable with the one or more PDP autocorrelation vectors 610 for identifying the set of b-coefficients, each of the pre-stored matrices based at least in part on a corresponding precoding rule used by the network node 110 and on a respective one of the multiple quantities of antennas. As such, the UE 120 may use a pre-stored matrix 615 per quantity of receive antennas. The UE 120 may then dynamically change the quantity of receive antennas and select a pre-stored matrix 615 accordingly, based at least in part on a quantity of receive antennas used by the UE 120 to receive the received signal.

Alternatively, the network node 110 may report an estimated PDP autocorrelation (the PDP autocorrelation vector 610) to the UE 120 to enable the UE 120 to calculate the b-coefficients. In such cases, the UE 120 may receive first information indicative of the PDP autocorrelation vector 610 from the network node 110. The network node 110 may estimate the PDP autocorrelation vector 610 from sounding reference signal (SRS) measurements, and the report may include a single PDP autocorrelation vector 610 or multiple PDP autocorrelation vectors 610. If the report includes a list of multiple PDP autocorrelation vectors 610, the network node 110 may also indicate a weight per PDP, where the weight may represent a percentage of transmit antennas of the network node 110 for which each of the PDPs may be applicable.

The UE 120 may identify the set of b-coefficients for use in the DPoD procedure based at least in part on the one or more PDP autocorrelation vectors 610 indicated by the network node 110. In addition, the UE 120 may apply the DPoD procedure to the received signal by using the set of b-coefficients to reduce the transmitter-induced non-linearity component of the received signal. The UE 120 may use the b-coefficients B(n) in the DPoD procedure to calculate an average interference 630 (e.g., an average non-linear interference I(x)) associated with the received signal. The average interference calculation may also include data (via a transmit path 625). The data, the average interference 630, and the precoded channel ($H_{DMRS}$) 635 may be subtracted (via a subtraction 640) to output the received signal to the UE 120 (e.g., the receiver 605), which may iteratively subtract the average interference 630 from the received signal to reduce or remove the non-linear component.

As indicated above, FIG. 6 is provided as an example. Other examples may differ from what is described with regard to FIG. 6.

In some cases, a first degree of non-linearity ($T(t) \cdot |T(t)|^2$) may be represented as follows:

$$I_s(f) = \Sigma_r U_{r,s}*(f)(\Sigma_i C_i H_{r,i}(f) \mathcal{F}\{(\mathcal{F}^{-1}(\Sigma_s P_{i,s}(f)X_s(f))| \mathcal{F}^{-1}\{\Sigma_s P_{i,s}(f)X_s(f)\}|^2\}),$$

where $I_s(f)$ is the first degree of the non-linearity captured at a receiver device (e.g., the UE) after being multiplied by an SVD-derived matrix $U^H$,
f is the subcarrier index,
r is the Rx antenna index,
i is the Tx antenna index,
s is the layer index,
$C_i$ are the NL coefficients,
H is the channel matrix,
$\mathcal{F}\{*\}$ denotes FFT transform,
P is the precoder, and
X is the transmitted stream signal.

In the time-domain, the first degree of non-linearity may be represented as follows:

$$i_s(t) = \Sigma_r u_{r,s}*(-t) \circledast (\Sigma_i C_i h_{r,i}(t) \circledast ((\Sigma_s p_{i,s}(t) \circledast x_s(t) |\Sigma_s p_{i,s}(t) \circledast x_s(t)|^2)).$$

In some cases, as the number of Tx antennas increases, reconstruction of the non-linear signal may not be feasible, for example, since $C_i$, $H_{r,i}(f)$ and $P_{i,s}(f)$ are unknown parameters that exist per Tx antenna, and thus, either need to be estimated, or in the case of the precoder, need to be transferred through the channel. This may result in a loss of bandwidth allocated for data transmissions. In some cases, even if these parameters were known, reconstructing the signal using this expression may incur very high-complexity, for example, as a result of the number of required FFT and IFFT operations.

In some cases, for example, using the model described in connection with FIG. 5, the non-linearity may be approximated per stream(s) as follows, and may then be cancelled from the signal:

$$i_s(t) = \Sigma_{s_2=1}^{n_{layers}} \Sigma_{n=0}^{N_{fft}-1} x_s(t)|x_{s2}(t-n)|^2 b(n,s,s_2) \text{ for every } s \in [1, \ldots, n_{layers}], t \in [0, \ldots, n_{fft}-1].$$

In one example, non-linearity signals may be generated offline for multiple channel realizations with a known PDP. The non-linearity signals may be averaged, and coefficients $b(n, s, s_2)$ may be calculated by projecting the non-linearity on the kernels $x_s(t)|x_{s2}(t-n)|^2$ using a least-squares method. In another example (e.g., as described above with respect to FIGS. 5-6), a matrix transformation may be pre-calculated and may be stored in a memory for each combination of a number of reception antennas, a number of transmission antennas, and a number of layers. The matrix may be used to transform the cross-correlation of the PDP of the channel to the coefficients $b(n, s, s_2)$. However, every matrix multiplication that is required may introduce a bottleneck (e.g., $O(N_{fft}^2)$) which may increase with the number of transmitting antennas. As described above, this may result in increased UE power consumption due to the increased digital post-distortion processing that is needed to correct the non-linear distortions resulting from the increased number of transmission antennas, and may result in a loss of available bandwidth for transmitting data signals.

Figure 7:
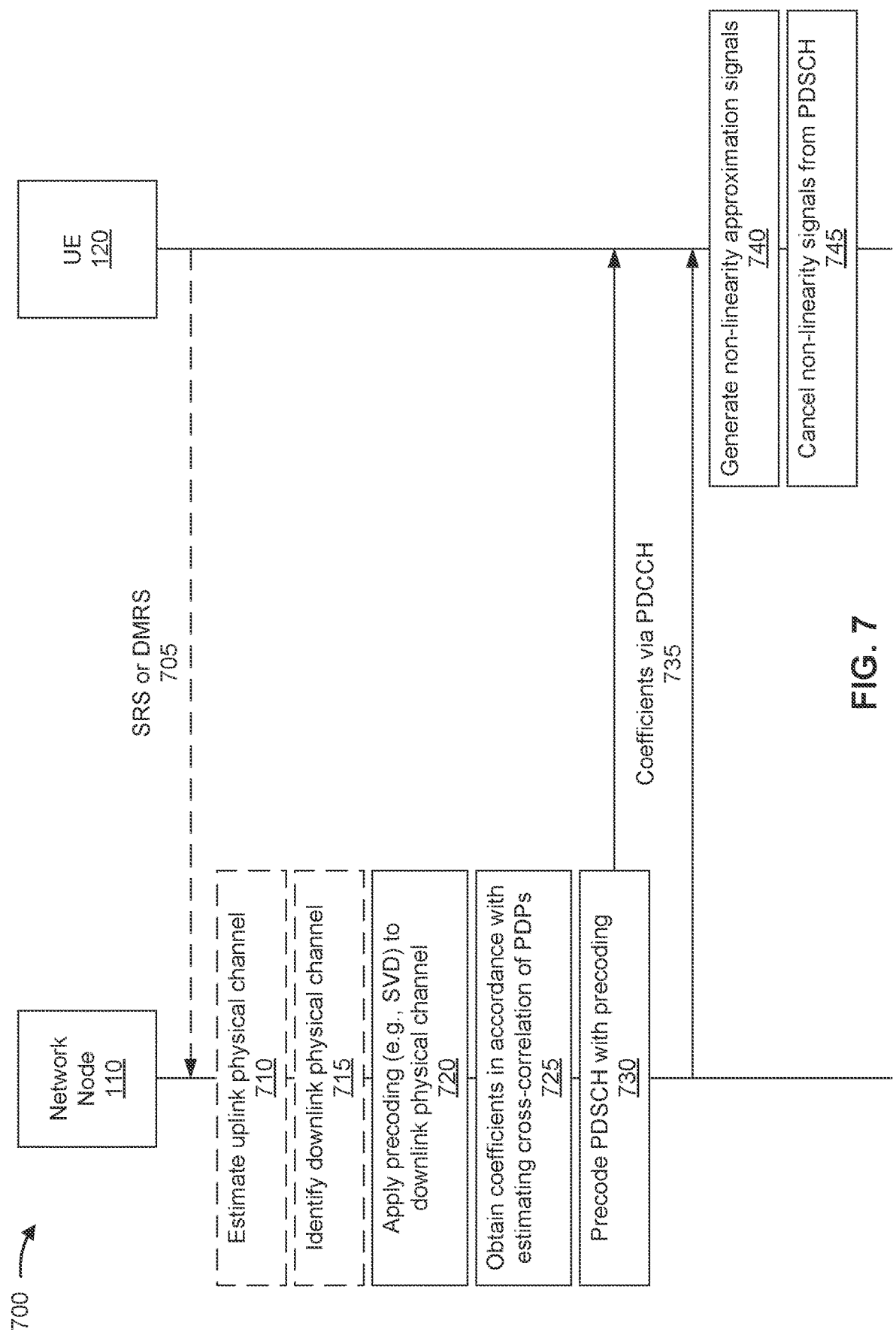
FIG. 7 is a diagram illustrating an example of coefficient estimation for non-linearity cancellation, in accordance with the present disclosure.

FIG. 7 is a diagram illustrating an example 700 of coefficient estimation for non-linearity cancellation, in accordance with the present disclosure.

As shown by reference number 705, the UE 120 may transmit, and the network node 110 may receive, an SRS or a DMRS. An SRS may carry information used for uplink channel estimation, which may be used for scheduling, link adaptation, precoder selection, or beam management, among other examples. The network node 110 may configure one or more SRS resource sets for the UE 120, and the UE 120 may transmit SRSs on the configured SRS resource sets. A DMRS may carry information used to estimate a radio channel for demodulation of an associated physical channel (such as a PDCCH or a PDSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. In some examples, the UE 120 may transmit only the SRS. In some other examples, the UE 120 may transmit only the DMRS. In some other examples, the UE 120 may transmit the SRS and the DMRS.

As shown by reference number 710, the network node 110 may estimate an uplink physical channel. For example, the network node 110 may estimate an uplink physical channel between the network node 110 and the UE 120. In some aspects, the network node 110 may estimate the uplink physical channel based at least in part on the SRS or the DMRS. For example, the network node 110 may measure the SRS or the DMRS, may perform channel estimation based at least in part on the measurements associated with the SRS or the DMRS, and may use the measurements to configure the uplink physical channel between the network node 110 and the UE 120.

As shown by reference number 715, the network node 110 may identify a downlink physical channel. For example, the network node 110 may derive the downlink physical channel between the network node 110 and the UE 120. In some aspects, the network node 110 may identify the downlink physical channel between the network node 110 and the UE 120 based at least in part on a reciprocity characteristic between the downlink channels and the uplink channels associated with the network node 110 and the UE 120.

As shown by reference number 720, the network node 110 may apply a precoding operation to the downlink physical channel. In some aspects, the precoding operation may be an SVD precoding operation. As described herein, SVD precoding may enable spatial separation of a communication channel into multiple parallel subchannels, may mitigate interference between transmitted signals (such as signals transmitted from a plurality of different transmitting antennas), and may optimize the transmissions to maximize a signal-to-noise (SNR) ratio at the receiver and improve system throughput. In some other aspects, other types of precoding operations may be applied to the downlink physical channel.

As shown by reference number 725, the network node 110 may obtain one or more coefficients in accordance with estimating a cross-correlation of a plurality of power delay profiles. In some aspects, the network node 110 may generate the one or more coefficients based at least in part on estimating a cross-correlation of a plurality of power delay profiles for a time-domain transformation of the precoder (e.g., the SVD precoder). For example, the network node 110 may estimate a cross-correlation of the power delay profiles (associated with a plurality of transmitting antennas) based at least in part on applying the precoding operation to the downlink physical channel, and may generate a plurality of coefficients based at least in part on estimating the cross-correlation of the plurality of power delay profiles for the time-domain transformation of the precoder. In some aspects, obtaining (e.g., generating) the plurality of coefficients may include generating the following:

$b(n,s,s_2)$ for any $n \in [0, \ldots, n_{fft}-1], s \in [1, \ldots, n_{layers}]$, $s_2 \in [1, \ldots, n_{layers}]$.

As shown by reference number 730, the network node 110 may precode a PDSCH communication in accordance with a result of the precoding operation. For example, the network node 110 may precode a PDSCH communication based at least in part on the result of the precoding operation, and may transmit the precoded data to the UE 120 via the PDSCH communication. In some aspects, for example, when the precoding operation is an SVD precoding operation, the precoded data may be SVD precoded data.

As shown by reference number 735, the network node 110 may transmit, and the UE 120 may receive, the one or more coefficients. For example, the network node 110 may transmit, and the UE 120 may receive, a PDCCH communication that includes the plurality of coefficients. In some aspects, transmitting the plurality of coefficients may include transmitting $b(n, s, s_2)$, where b is a non-linear interference parameter, n is a fast Fourier transform size, s is a non-linearity associated with a first stream, and $s_2$ is a non-linearity associated with a second stream. In some aspects, the plurality of coefficients may be generated in accordance with the following:

$$b(n, s, s_2) = (-\delta(n)\delta(s - s_2) + 2) \cdot \left( \lambda_s(0) \sum_{i=1}^{N_{tx}} \sum_{m_1=0}^{N_{fft}-1} |v_{i,s}(-m_1)|^2 |v_{i,s_2}(n - m_1)|^2 \right)$$

for every $n \in [0, \ldots, n_{fft} - 1]$, $s \in [1, \ldots, n_{layers}], s_2 \in [1, \ldots, n_{layers}]$.

As shown by reference number 740, the UE 120 may generate one or more non-linearity approximation signals. The UE 120 may generate the one or more non-linearity approximation signals in accordance with receiving the plurality of coefficients. For example, the UE 120 may receive a PDCCH communication from the network node 110 that includes the plurality of coefficients $b(n, s, s_2)$, and may generate a plurality of non-linearity coefficients is (t) based at least in part on the plurality of coefficients.

As shown by reference number 745, the UE 120 may cancel the non-linearity signals from the PDSCH communication. In some aspects, the UE 120 may cancel the non-linearity signals from the PDSCH communication using a DPoD model and/or using DPoD processing. In some aspects, the non-linearity signals may be canceled in accordance with the following:

$i_s(t) = \Sigma_{s_2=1}^{n_{layers}} \Sigma_{n=0}^{N_{fft}-1} x_s(t) |x_{s_2}(t-n)|^2 b(n,s,s_2)$ for every $s \in [1, \ldots, n_{layers}], t \in [0, \ldots, n_{fft}-1]$.

Additional details regarding these features are described in connection with FIG. 8. Cancelling the non-linearity signals in accordance with the example 700 may enable non-linearity signals to be cancelled from communications using any number of antennas without (significantly) increasing UE power consumption or reducing network bandwidth.

As indicated above, FIG. 7 is provided as an example. Other examples may differ from what is described with regard to FIG. 7.

Figure 8:
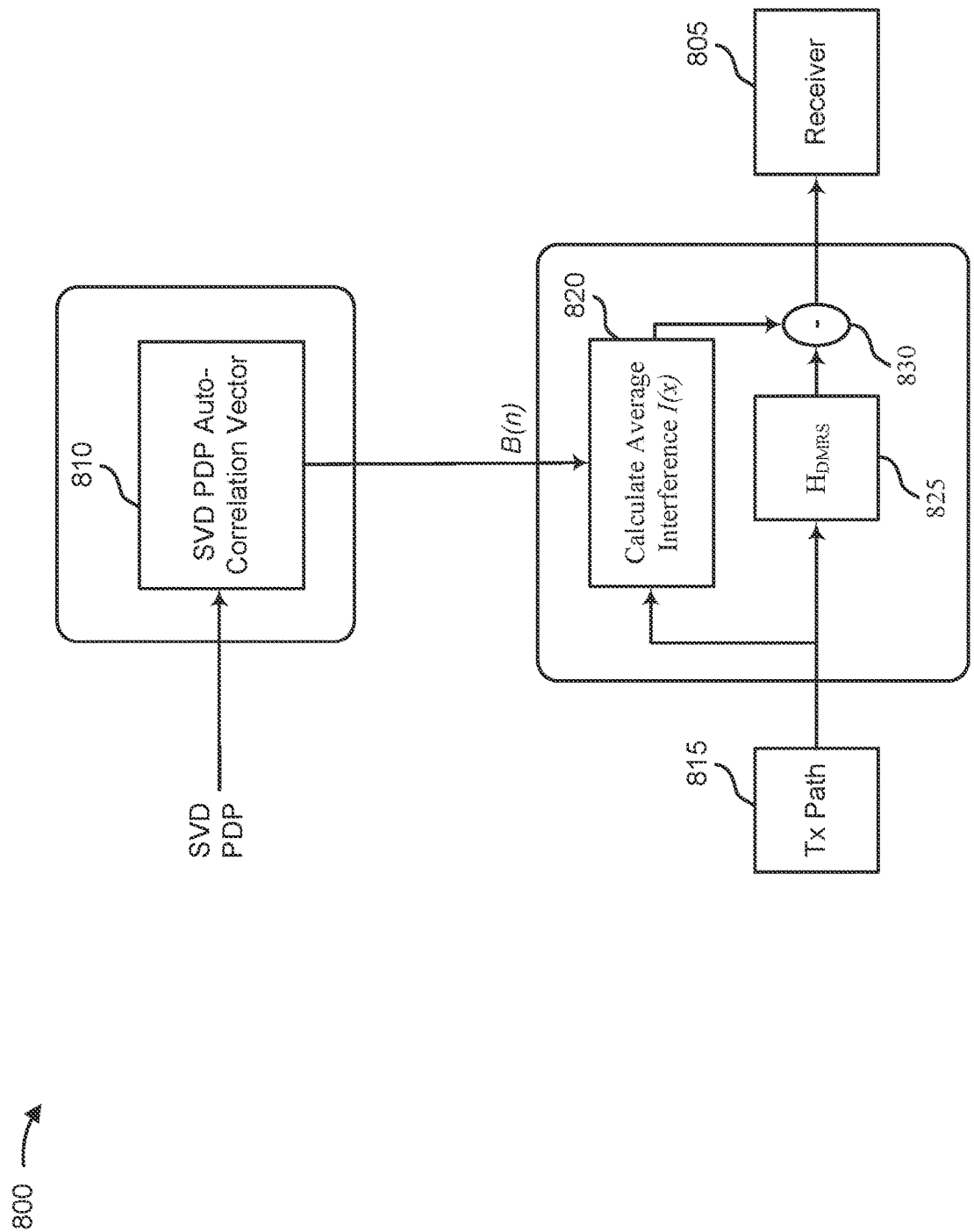
FIG. 8 is a diagram illustrating example components configured to perform coefficient estimation for non-linearity cancellation, in accordance with the present disclosure.

FIG. 8 is a diagram illustrating example components 800 configured to perform coefficient estimation for non-linearity cancellation, in accordance with the present disclosure. In some examples, the components 800 configured to perform the coefficient estimation may implement aspects of the wireless communications system 100 or may be implemented by aspects of the wireless communications system 100. For example, a UE 120 (e.g., a receiver 805) may use the coefficient estimation to identify one or more b-coefficients (e.g., B(n)) for use in a DPoD procedure to reduce non-linearities of a received signal.

In some aspects, the UE 120 may receive a signal from a network node 110 that includes a plurality of coefficients associated with a non-linearity of a downlink channel (such as the coefficients described above in connection with FIG. 7). To reduce the transmitter-induced non-linearity component of the received signal, the UE 120 may receive an indication to apply a DPoD procedure to the received signal. In some examples, the UE 120 (e.g., the receiver 805) may measure and signal an SVD PDP autocorrelation vector 810 to the network node 110 such that the network node 110 may calculate the b-coefficients. While the PDP autocorrelation vector 810 is shown as an SVD PDP autocorrelation vector, other types of PDP autocorrelation vectors may be used. In some examples, the UE 120 may determine the SVD PDP autocorrelation vector 810 based at least in part on CSI-RS measurements, where the network node 110 may dedicate some CSI-RS resources for the PDP autocorrelation measurements. That is, the UE 120 may determine the SVD PDP autocorrelation vector 810 using measurements of one or more reference signals transmitted by the network node 110. In some examples, the SVD PDP autocorrelation vector 810 may be based at least in part on additional or new reference signals to allow a greater time span estimation of the SVD PDP.

In some cases, the network node 110 may determine which transmit antennas (or a mixture of one or more antennas) to use for transmitting the CSI-RSs such that the SVD PDP autocorrelation vector 810 reported by the UE 120 may be representative of the communication channel. In such cases, the network node 110 may transmit, to the UE 120, information indicative of one or more transmit antennas associated with the CSI-RSs or other reference signals, and the UE 120 may determine the SVD PDP autocorrelation vector 810 based at least in part on the information. The UE 120 may report (to the network node 110 for use in calculating the b-coefficients) a single SVD PDP autocorrelation vector 810 that is averaged over all CSI-RS ports dedicated for the DPoD procedure. Alternatively, the UE 120 may report multiple SVD PDP autocorrelation vectors 810, in which case the network node 110 may specify which transmit antenna groups are to be included in the averaging process for each one of the reported SVD PDP autocorrelation vectors 810. That is, the information indicative of the one or more transmit antennas may indicate an organization of the one or more transmit antennas into one or more transmit antenna groups, where the UE 120 may determine an SVD PDP autocorrelation vector 810 (or at least an SVD PDP autocorrelation value) for each of the one or more transmit antenna groups. The UE 120 may transmit a report indicative of the one or more SVD PDP autocorrelation vectors 810 in accordance with a periodic schedule (e.g., according to a periodicity), a semi-persistent schedule (e.g., semi-persistently), or an aperiodic schedule (e.g., irregularly). In such cases, the network node 110 may determine the one or more PDP autocorrelation values based at least in part on the SVD PDP autocorrelation vector 810 indicated in the report.

The UE 120 may identify the set of b-coefficients for use in the DPoD procedure based at least in part on the one or more SVD PDP autocorrelation vectors 810 indicated by the network node 110. In addition, the UE 120 may apply the DPoD procedure to the received signal by using the set of b-coefficients to reduce the transmitter-induced non-linearity component of the received signal. The UE 120 may use the b-coefficients B(n) in the DPoD procedure to calculate an average interference 820 (e.g., an average non-linear interference I(x)) associated with the received signal. The average interference calculation may also include data (via a transmit path 815). The data, the average interference 820, and the precoded channel ($H_{DMRS}$) 825 may be subtracted (via a subtraction 830) to output the received signal to the UE 120 (e.g., the receiver 805), which may iteratively subtract the average interference 820 from the received signal to reduce or remove the non-linear component.

In some aspects, such as in the example of SVD precoding, the coefficients may be calculated directly (e.g., without using matrix transformation) using a cross-correlation of the PDPs of a time-domain transformation of the SVD precoder V(f). This may reduce a complexity of the calculations, for example to $O(N_{fft} \log(N_{fft}))$. If the channel PDP changes (slowly) over time, additional realizations of the channel with the same PDP may be used to improve the estimation.

In one example SVD, a channel matrix H may be deconstructed for every subcarrier f in accordance with the following:

$$H(f) = U(f) \cdot \Lambda(f) \cdot V^H(f),$$

where U(f), V(f) are Hermitian matrices, and
$\Lambda(f)$ is the singular values matrix.
Additionally, the following may be performed:

$$\Lambda(f) = \begin{pmatrix} \Lambda_1(f) & \underline{0} & \underline{0} \\ \underline{0} & \ddots & \underline{0} \\ \underline{0} & \underline{0} & \Lambda_S(f) \end{pmatrix},$$

$V(f) = [\underline{V}_1(f), \ldots, \underline{V}_S(f)]$, where S indicates the total number of layers.

In SVD, the precoder selected for the s-th layer may be $P_s(f)=V_s(f)$. In this case, as described above, the non-linearity may be converged to $$i_s(t) \approx \sum_{s_2=1}^{n_{layers}} \sum_{n=0}^{N_{fft}-1} x_s(t)|x_{s2}(t-n)|^2 b(n, s, s_2)$$

for every $s \in [1, \ldots, n_{layers}]$, $t \in [0, \ldots, n_{fft}-1]$, where $b(n,s,s_2) = (-\delta(n)\delta(s-s_2)+2) \cdot (\lambda_s(0) \sum_{i=1}^{N_{tx}} \sum_{m_1=0}^{N_{fft}-1} |v_{i,s}(-m_1)|^2 |v_{i,s_2}(n-m_1)|^2)$ for every $n \in [0, \ldots, n_{fft}-1]$, $s \in [1, \ldots, n_{layers}], s_2 \in [1, \ldots, n_{layers}]$ $v_{i,s}(t)$ is the i-th element of time domain version of the SVD precoder $V_s(f)$, $(v_{i,s}(t) = \mathcal{F}^{-1}\{V_{i,s}(f)\})$, $\lambda_s(0)$ is the time domain version of the s-th singular value signal $\Lambda_s(f)$ sampled at t=0 $(\lambda_s(0) = \mathcal{F}^{-1}\{\Lambda_s(f)\}|_{t=0})$, $\delta(n)$ is the Kronecker delta function, equal to 1 at n=0, and 0 elsewhere.

As indicated above, FIG. 8 is provided as an example. Other examples may differ from what is described with regard to FIG. 8.

Figure 9:
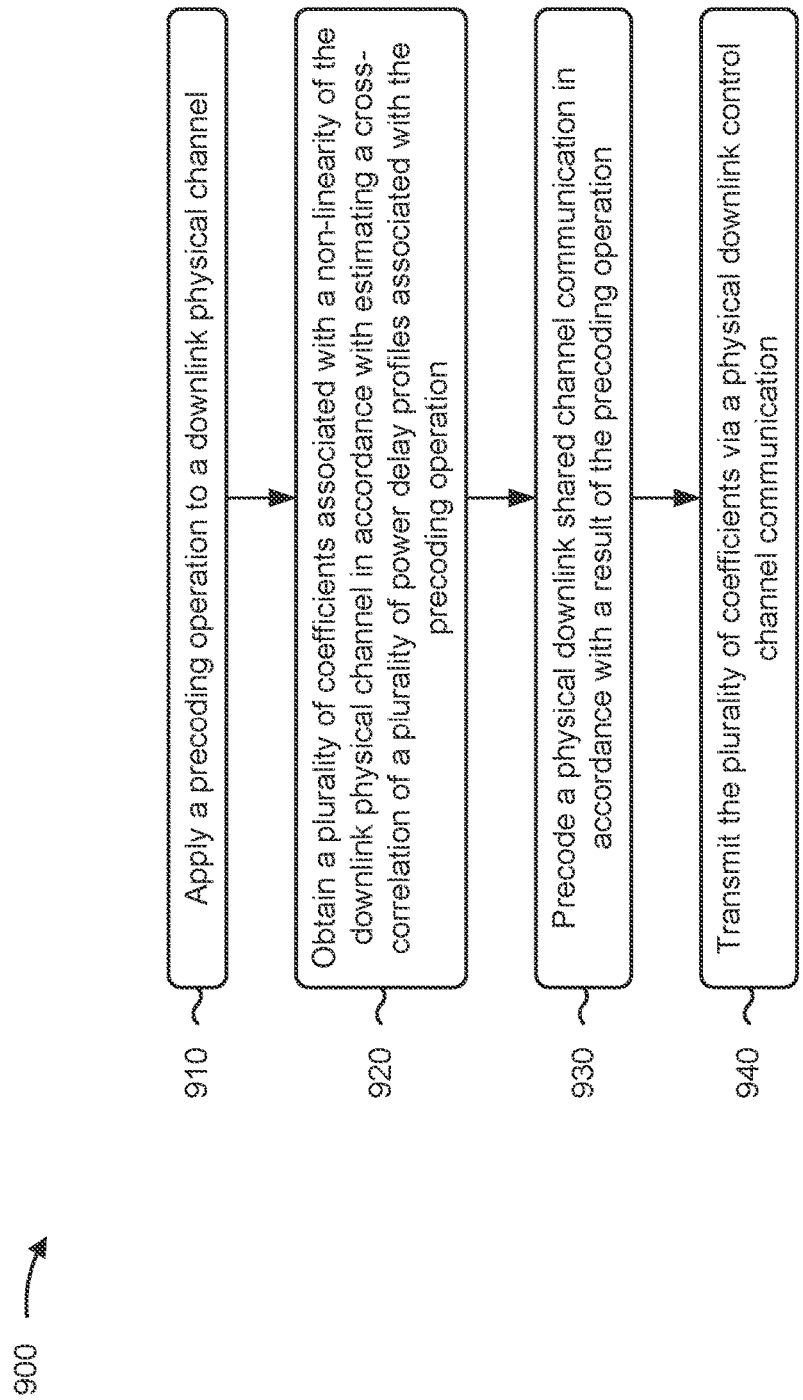
FIG. 9 is a diagram illustrating an example process performed, for example, at a network node or an apparatus of a network node, in accordance with the present disclosure.

FIG. 9 is a diagram illustrating an example process 900 performed, for example, at a network node or an apparatus of a network node, in accordance with the present disclosure. Example process 900 is an example where the apparatus or the network node (e.g., network node 110) performs operations associated with coefficient estimation for non-linearity cancellation.

As shown in FIG. 9, in some aspects, process 900 may include applying a precoding operation to a downlink physical channel (block 910). For example, the network node (e.g., using communication manager 1106, depicted in FIG. 11) may apply a precoding operation to a downlink physical channel, as described above.

As further shown in FIG. 9, in some aspects, process 900 may include obtaining a plurality of coefficients associated with a non-linearity of the downlink physical channel in accordance with estimating a cross-correlation of a plurality of power delay profiles associated with the precoding operation (block 920). For example, the network node (e.g., using reception component 1102 and/or communication manager 1106, depicted in FIG. 11) may obtain a plurality of coefficients associated with a non-linearity of the downlink physical channel in accordance with estimating a cross-correlation of a plurality of power delay profiles associated with the precoding operation, as described above.

As further shown in FIG. 9, in some aspects, process 900 may include precoding a physical downlink shared channel communication in accordance with a result of the precoding operation (block 930). For example, the network node (e.g., using communication manager 1106, depicted in FIG. 11) may precode a physical downlink shared channel communication in accordance with a result of the precoding operation, as described above.

As further shown in FIG. 9, in some aspects, process 900 may include transmitting the plurality of coefficients via a physical downlink control channel communication (block 940). For example, the network node (e.g., using transmission component 1104 and/or communication manager 1106, depicted in FIG. 11) may transmit the plurality of coefficients via a physical downlink control channel communication, as described above.

Process 900 may include additional aspects, such as any single aspect or any combination of aspects described below and/or in connection with one or more other processes described elsewhere herein.

In a first aspect, applying the precoding operation to the downlink physical channel comprises applying a singular value decomposition precoding operation to the downlink physical channel.

In a second aspect, alone or in combination with the first aspect, the plurality of power delay profiles are associated with a time domain transformation of the singular value decomposition precoding operation.

In a third aspect, alone or in combination with one or more of the first and second aspects, each power delay profile of the plurality of power delay profiles corresponds to a time domain transformation element of a plurality of time domain transformation elements associated with the time domain transformation of the singular value decomposition precoding operation.

In a fourth aspect, alone or in combination with one or more of the first through third aspects, process 900 includes estimating, prior to applying the precoding operation to the downlink physical channel, one or more characteristics of an uplink physical channel between the network node and a user equipment.

In a fifth aspect, alone or in combination with one or more of the first through fourth aspects, estimating the one or more characteristics of the uplink physical channel between the network node and the user equipment comprises estimating the one or more characteristics of the uplink physical channel between the network node and the user equipment in accordance with a sounding reference signal or a demodulation reference signal received from the user equipment.

In a sixth aspect, alone or in combination with one or more of the first through fifth aspects, process 900 includes identifying, after estimating the one or more characteristics of the uplink physical channel between the network node and the user equipment, and prior to applying the precoding operation to the downlink physical channel, the downlink physical channel in accordance with a reciprocity characteristic between a plurality of downlink channels and the uplink physical channel.

In a seventh aspect, alone or in combination with one or more of the first through sixth aspects, transmitting the plurality of coefficients via the physical downlink control channel communication comprises transmitting the plurality of coefficients via the physical downlink control channel communication to the user equipment.

In an eighth aspect, alone or in combination with one or more of the first through seventh aspects, obtaining the plurality of coefficients comprises calculating the plurality of coefficients associated with the non-linearity of the downlink physical channel without performing a matrix transformation.

In a ninth aspect, alone or in combination with one or more of the first through eighth aspects, obtaining the plurality of coefficients comprises obtaining a non-linear interference parameter that is a function of a fast Fourier transform size, a non-linearity associated with a first stream, and a non-linearity associated with a second stream.

In a tenth aspect, alone or in combination with one or more of the first through ninth aspects, precoding the physical downlink shared channel communication in accordance with the result of the precoding operation comprises transmitting singular value decomposition precoding data to a user equipment in accordance with the result of the precoding operation.

In an eleventh aspect, alone or in combination with one or more of the first through tenth aspects, the plurality of coefficients are associated with a plurality of transmitting antennas for digital post-distortion processing at a user equipment.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
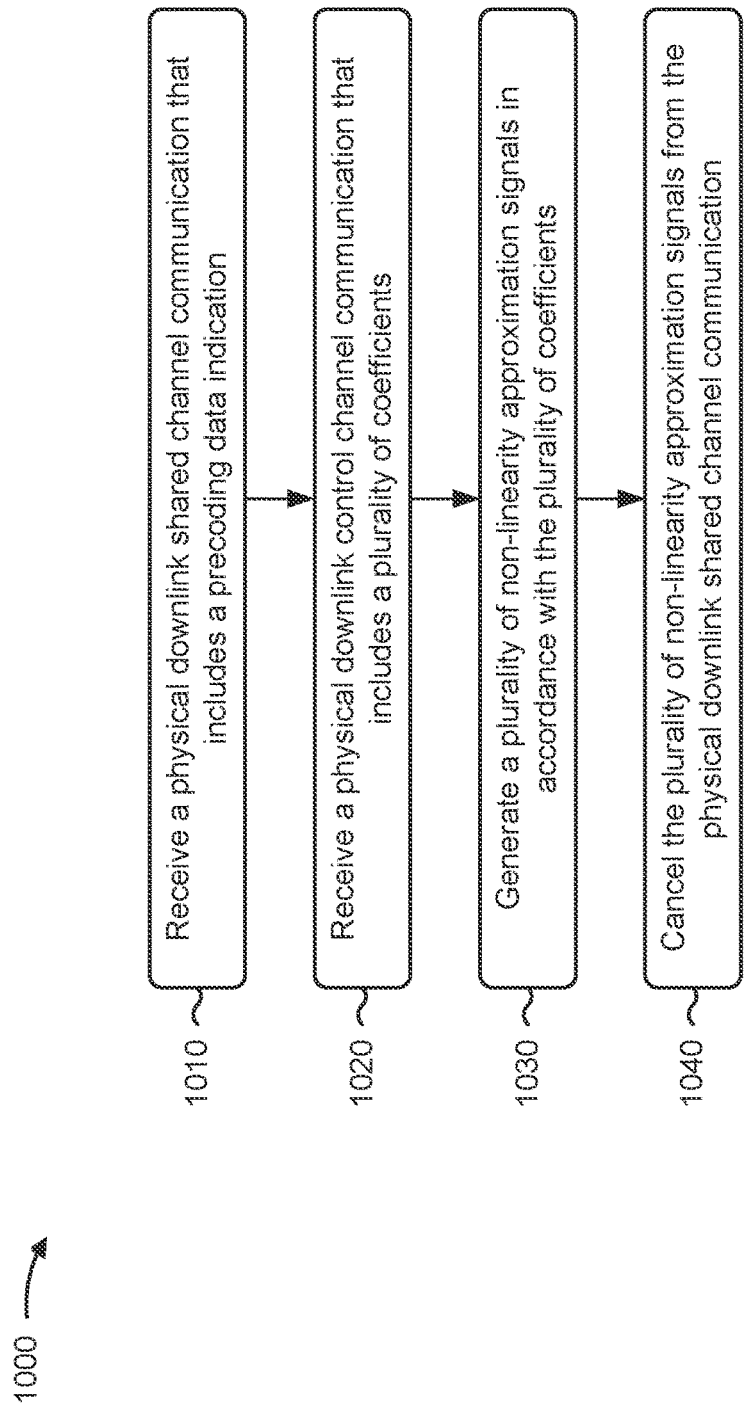
FIG. 10 is a diagram illustrating an example process performed, for example, at a UE or an apparatus of a UE, in accordance with the present disclosure.

FIG. 10 is a diagram illustrating an example process 1000 performed, for example, at a UE or an apparatus of a UE, in accordance with the present disclosure. Example process 1000 is an example where the apparatus or the UE (e.g., UE 120) performs operations associated with coefficient estimation for non-linearity cancellation.

As shown in FIG. 10, in some aspects, process 1000 may include receiving a physical downlink shared channel communication that includes a precoding data indication (block 1010). For example, the UE (e.g., using reception component 1202 and/or communication manager 1206, depicted in FIG. 12) may receive a physical downlink shared channel communication that includes a precoding data indication, as described above.

As further shown in FIG. 10, in some aspects, process 1000 may include receiving a physical downlink control channel communication that includes a plurality of coefficients (block 1020). For example, the UE (e.g., using reception component 1202 and/or communication manager 1206, depicted in FIG. 12) may receive a physical downlink control channel communication that includes a plurality of coefficients, as described above.

As further shown in FIG. 10, in some aspects, process 1000 may include generating a plurality of non-linearity approximation signals in accordance with the plurality of coefficients (block 1030). For example, the UE (e.g., using communication manager 1206, depicted in FIG. 12) may generate a plurality of non-linearity approximation signals in accordance with the plurality of coefficients, as described above.

As further shown in FIG. 10, in some aspects, process 1000 may include canceling the plurality of non-linearity approximation signals from the physical downlink shared channel communication (block 1040). For example, the UE (e.g., using communication manager 1206, depicted in FIG. 12) may cancel the plurality of non-linearity approximation signals from the physical downlink shared channel communication, as described above.

Process 1000 may include additional aspects, such as any single aspect or any combination of aspects described below and/or in connection with one or more other processes described elsewhere herein.

In a first aspect, canceling the plurality of non-linearity approximation signals from the physical downlink shared channel communication comprises performing digital post-distortion processing to cancel the plurality of non-linearity approximation signals from the physical downlink shared channel communication.

In a second aspect, alone or in combination with the first aspect, the plurality of non-linearity approximation signals correspond to a plurality of transmitting antennas associated with a network node.

In a third aspect, alone or in combination with one or more of the first and second aspects, the precoding data indication included in the physical downlink shared channel communication is associated with a singular value decomposition precoding operation.

In a fourth aspect, alone or in combination with one or more of the first through third aspects, the singular value decomposition precoding operation is associated with a cross-correlation of a plurality of power delay profiles associated with a time domain transformation of the singular value decomposition precoding operation.

In a fifth aspect, alone or in combination with one or more of the first through fourth aspects, each power delay profile of the plurality of power delay profiles corresponds to a time domain transformation element of a plurality of time domain transformation elements associated with the time domain transformation of the singular value decomposition precoding operation.

In a sixth aspect, alone or in combination with one or more of the first through fifth aspects, process 1000 includes transmitting a sounding reference signal or a demodulation reference signal to be used for estimating an uplink physical channel, wherein the plurality of coefficients are based at least in part on the sounding reference signal or the demodulation reference signal.

In a seventh aspect, alone or in combination with one or more of the first through sixth aspects, receiving the plurality of coefficients comprises receiving a non-linear interference parameter that is a function of a fast Fourier transform size, a non-linearity associated with a first stream, and a non-linearity associated with a second stream.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
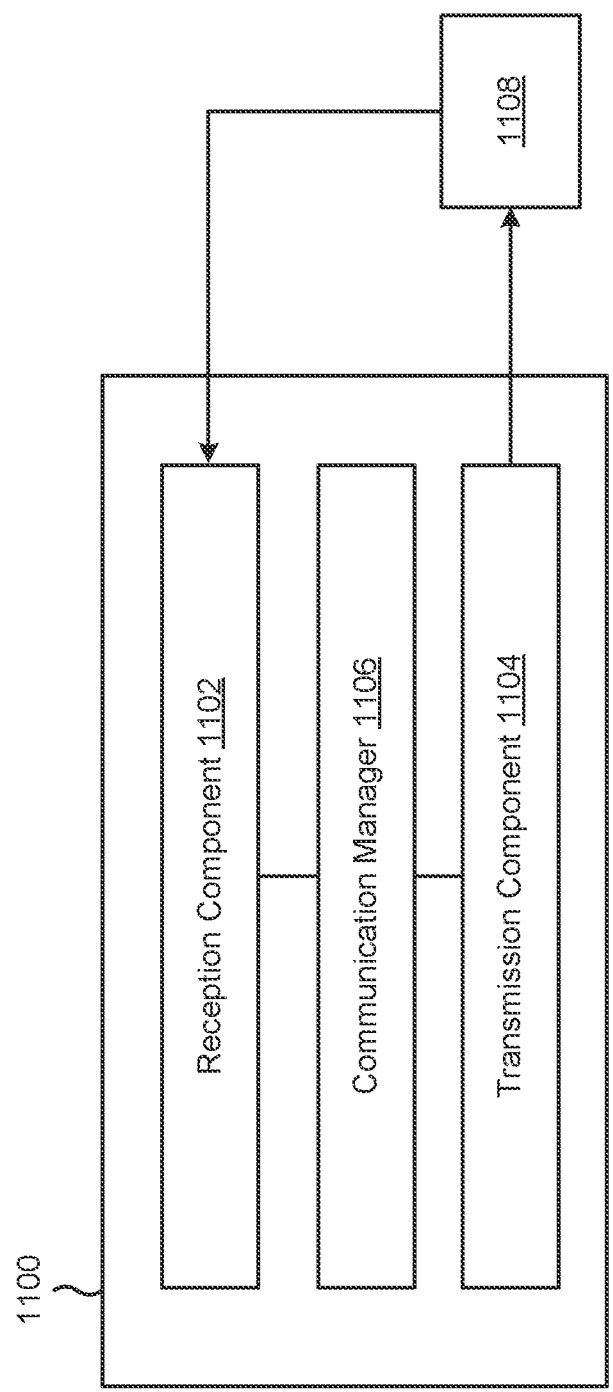
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a network node, or a network node may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager 150 described in connection with FIG. 1. As shown, the apparatus 1100 may communicate with another apparatus 1108, such as a UE or a network node (such as a CU, a DU, an RU, or a base station), using the reception component 1102 and the transmission component 1104.

In some aspects, the apparatus 1100 may be configured to perform one or more operations described herein in connection with FIGS. 7-8. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the network node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, one or more modems, one or more demodulators, one or more MIMO detectors, one or more receive processors, one or more controllers/processors, one or more memories, or a combination thereof, of the network node described in connection with FIG. 2. In some aspects, the reception component 1102 and/or the transmission component 1104 may include or may be included in a network interface. The network interface may be configured to obtain and/or output signals for the apparatus 1100 via one or more communications links, such as a backhaul link, a midhaul link, and/or a fronthaul link.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, one or more modems, one or more modulators, one or more transmit MIMO processors, one or more transmit processors, one or more controllers/processors, one or more memories, or a combination thereof, of the network node described in connection with FIG. 2. In some aspects, the transmission component 1104 may be co-located with the reception component 1102 in one or more transceivers.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/or provide control information to the reception component 1102 and/or the transmission component 1104 to control reception and/or transmission of communications.

The communication manager 1106 may apply a precoding operation to a downlink physical channel. The reception component 1102 may obtain a plurality of coefficients associated with a non-linearity of the downlink physical channel in accordance with estimating a cross-correlation of a plurality of power delay profiles associated with the precoding operation. The communication manager 1106 may precode a physical downlink shared channel communication in accordance with a result of the precoding operation. The transmission component 1104 may transmit the plurality of coefficients via a physical downlink control channel communication. The communication manager 1106 may estimate, prior to applying the precoding operation to the downlink physical channel, one or more characteristics of an uplink physical channel between the network node and a user equipment. The communication manager 1106 may identify, after estimating the one or more characteristics of the uplink physical channel between the network node and the user equipment, and prior to applying the precoding operation to the downlink physical channel, the downlink physical channel in accordance with a reciprocity characteristic between a plurality of downlink channels and the uplink physical channel.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
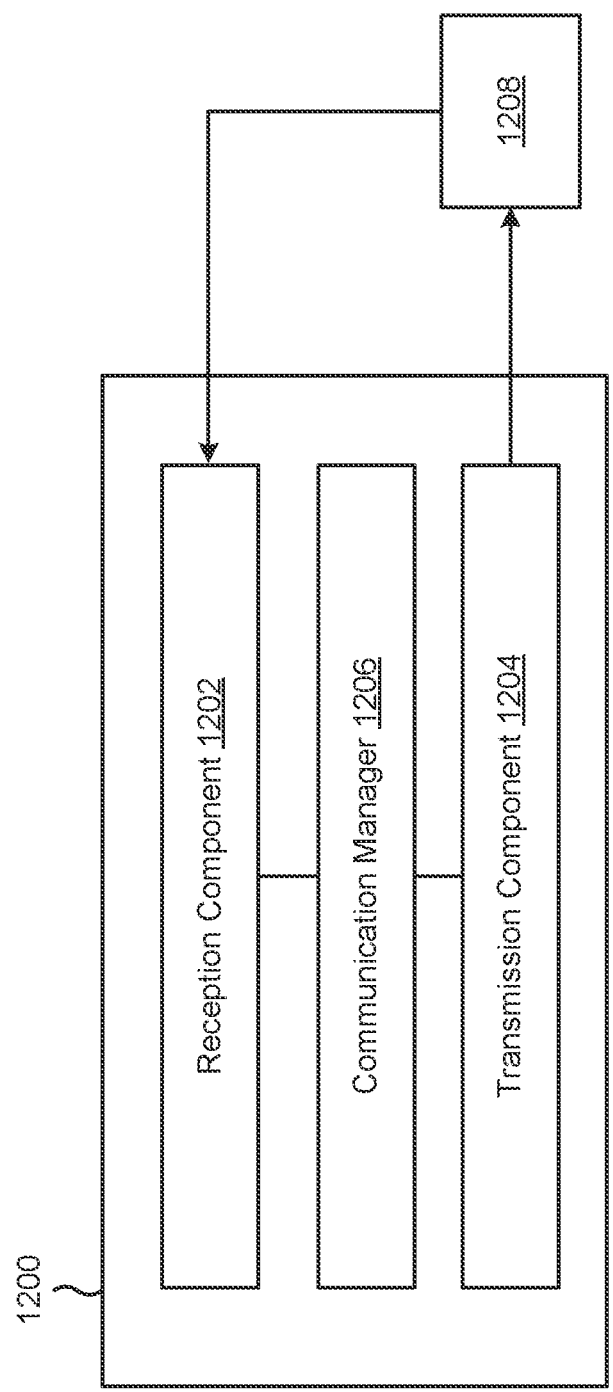
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a UE, or a UE may include the apparatus 1200. In some aspects, the apparatus 1200 includes a reception component 1202, a transmission component 1204, and/or a communication manager 1206, which may be in communication with one another (for example, via one or more buses and/or one or more other components). In some aspects, the communication manager 1206 is the communication manager 140 described in connection with FIG. 1. As shown, the apparatus 1200 may communicate with another apparatus 1208, such as a UE or a network node (such as a CU, a DU, an RU, or a base station), using the reception component 1202 and the transmission component 1204.

In some aspects, the apparatus 1200 may be configured to perform one or more operations described herein in connection with FIGS. 7-8. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1202 may receive communications, such as reference signals, control information, data communications, or a combination thereof, from the apparatus 1208. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, one or more modems, one or more demodulators, one or more MIMO detectors, one or more receive processors, one or more controllers/processors, one or more memories, or a combination thereof, of the UE described in connection with FIG. 2.

The transmission component 1204 may transmit communications, such as reference signals, control information, data communications, or a combination thereof, to the apparatus 1208. In some aspects, one or more other components of the apparatus 1200 may generate communications and may provide the generated communications to the transmission component 1204 for transmission to the apparatus 1208. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1204 may include one or more antennas, one or more modems, one or more modulators, one or more transmit MIMO processors, one or more transmit processors, one or more controllers/processors, one or more memories, or a combination thereof, of the UE described in connection with FIG. 2. In some aspects, the transmission component 1204 may be co-located with the reception component 1202 in one or more transceivers.

The communication manager 1206 may support operations of the reception component 1202 and/or the transmission component 1204. For example, the communication manager 1206 may receive information associated with configuring reception of communications by the reception component 1202 and/or transmission of communications by the transmission component 1204. Additionally, or alternatively, the communication manager 1206 may generate and/or provide control information to the reception component 1202 and/or the transmission component 1204 to control reception and/or transmission of communications.

The reception component 1202 may receive a physical downlink shared channel communication that includes a precoding data indication. The reception component 1202 may receive a physical downlink control channel communication that includes a plurality of coefficients. The communication manager 1206 may generate a plurality of non-linearity approximation signals in accordance with the plurality of coefficients. The communication manager 1206 may cancel the plurality of non-linearity approximation signals from the physical downlink shared channel communication. The transmission component 1204 may transmit a sounding reference signal or a demodulation reference signal to be used for estimating an uplink physical channel, wherein the plurality of coefficients are based at least in part on the sounding reference signal or the demodulation reference signal.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a network node, comprising: applying a precoding operation to a downlink physical channel; obtaining a plurality of coefficients associated with a non-linearity of the downlink physical channel in accordance with estimating a cross-correlation of a plurality of power delay profiles associated with the precoding operation; precoding a physical downlink shared channel communication in accordance with a result of the precoding operation; and transmitting the plurality of coefficients via a physical downlink control channel communication.

Aspect 2: The method of Aspect 1, wherein applying the precoding operation to the downlink physical channel comprises applying a singular value decomposition precoding operation to the downlink physical channel.

Aspect 3: The method of Aspect 2, wherein the plurality of power delay profiles are associated with a time domain transformation of the singular value decomposition precoding operation.

Aspect 4: The method of Aspect 3, wherein each power delay profile of the plurality of power delay profiles corresponds to a time domain transformation element of a plurality of time domain transformation elements associated with the time domain transformation of the singular value decomposition precoding operation.

Aspect 5: The method of any of Aspects 1-4, further comprising estimating, prior to applying the precoding operation to the downlink physical channel, one or more characteristics of an uplink physical channel between the network node and a user equipment.

Aspect 6: The method of Aspect 5, wherein estimating the one or more characteristics of the uplink physical channel between the network node and the user equipment comprises estimating the one or more characteristics of the uplink physical channel between the network node and the user equipment in accordance with a sounding reference signal or a demodulation reference signal received from the user equipment.

Aspect 7: The method of Aspect 5, further comprising identifying, after estimating the one or more characteristics of the uplink physical channel between the network node and the user equipment, and prior to applying the precoding operation to the downlink physical channel, the downlink physical channel in accordance with a reciprocity characteristic between a plurality of downlink channels and the uplink physical channel.

Aspect 8: The method of Aspect 7, wherein transmitting the plurality of coefficients via the physical downlink control channel communication comprises transmitting the plurality of coefficients via the physical downlink control channel communication to the user equipment.

Aspect 9: The method of any of Aspects 1-8, wherein obtaining the plurality of coefficients comprises calculating the plurality of coefficients associated with the non-linearity of the downlink physical channel without performing a matrix transformation.

Aspect 10: The method of any of Aspects 1-9, wherein obtaining the plurality of coefficients comprises obtaining a non-linear interference parameter that is a function of a fast Fourier transform size, a non-linearity associated with a first stream, and a non-linearity associated with a second stream.

Aspect 11: The method of any of Aspects 1-10, wherein precoding the physical downlink shared channel communication in accordance with the result of the precoding operation comprises transmitting singular value decomposition precoding data to a user equipment in accordance with the result of the precoding operation.

Aspect 12: The method of any of Aspects 1-11, wherein the plurality of coefficients are associated with a plurality of transmitting antennas for digital post-distortion processing at a user equipment.

Aspect 13: A method of wireless communication performed by a user equipment (UE), comprising: receiving a physical downlink shared channel communication that includes a precoding data indication; receiving a physical downlink control channel communication that includes a plurality of coefficients; generating a plurality of non-linearity approximation signals in accordance with the plurality of coefficients; and cancelling the plurality of non-linearity approximation signals from the physical downlink shared channel communication.

Aspect 14: The method of Aspect 13, wherein cancelling the plurality of non-linearity approximation signals from the physical downlink shared channel communication comprises performing digital post-distortion processing to cancel the plurality of non-linearity approximation signals from the physical downlink shared channel communication.

Aspect 15: The method of Aspect 14, wherein the plurality of non-linearity approximation signals correspond to a plurality of transmitting antennas associated with a network node.

Aspect 16: The method of any of Aspects 13-15, wherein the precoding data indication included in the physical downlink shared channel communication is associated with a singular value decomposition precoding operation.

Aspect 17: The method of Aspect 16, wherein the singular value decomposition precoding operation is associated with a cross-correlation of a plurality of power delay profiles associated with a time domain transformation of the singular value decomposition precoding operation.

Aspect 18: The method of Aspect 17, wherein each power delay profile of the plurality of power delay profiles corresponds to a time domain transformation element of a plurality of time domain transformation elements associated with the time domain transformation of the singular value decomposition precoding operation.

Aspect 19: The method of any of Aspects 13-18, further comprising transmitting a sounding reference signal or a demodulation reference signal to be used for estimating an uplink physical channel, wherein the plurality of coefficients are based at least in part on the sounding reference signal or the demodulation reference signal.

Aspect 20: The method of any of Aspects 13-19, wherein receiving the plurality of coefficients comprises receiving a non-linear interference parameter that is a function of a fast Fourier transform size, a non-linearity associated with a first stream, and a non-linearity associated with a second stream.

Aspect 21: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-20.

Aspect 22: An apparatus for wireless communication at a device, the apparatus comprising one or more memories and one or more processors coupled to the one or more memories, the one or more processors configured to cause the device to perform the method of one or more of Aspects 1-20.

Aspect 23: An apparatus for wireless communication, the apparatus comprising at least one means for performing the method of one or more of Aspects 1-20.

Aspect 24: A non-transitory computer-readable medium storing code for wireless communication, the code comprising instructions executable by one or more processors to perform the method of one or more of Aspects 1-20.

Aspect 25: A non-transitory computer-readable medium storing a set of instructions for wireless communication, the set of instructions comprising one or more instructions that, when executed by one or more processors of a device, cause the device to perform the method of one or more of Aspects 1-20.

Aspect 26: A device for wireless communication, the device comprising a processing system that includes one or more processors and one or more memories coupled with the one or more processors, the processing system configured to cause the device to perform the method of one or more of Aspects 1-20.

Aspect 27: An apparatus for wireless communication at a device, the apparatus comprising one or more memories and one or more processors coupled to the one or more memories, the one or more processors individually or collectively configured to cause the device to perform the method of one or more of Aspects 1-20.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a network node, comprising:
    one or more memories; and
    one or more processors coupled to the one or more memories, the one or more processors individually or collectively configured to cause the network node to:
        apply a precoding operation to a downlink physical channel;
        obtain a plurality of coefficients associated with a non-linearity of the downlink physical channel in accordance with estimating a cross-correlation of a plurality of power delay profiles associated with the precoding operation;
        precode a physical downlink shared channel communication in accordance with a result of the precoding operation; and
        transmit the plurality of coefficients via a physical downlink control channel communication.

2. The apparatus of claim 1, wherein the one or more processors, to cause the network node to apply the precoding operation to the downlink physical channel, are configured to cause the network node to apply a singular value decomposition precoding operation to the downlink physical channel.

3. The apparatus of claim 2, wherein the plurality of power delay profiles are associated with a time domain transformation of the singular value decomposition precoding operation.

4. The apparatus of claim 3, wherein each power delay profile of the plurality of power delay profiles corresponds to a time domain transformation element of a plurality of time domain transformation elements associated with the time domain transformation of the singular value decomposition precoding operation.

5. The apparatus of claim 1, wherein the one or more processors are further configured to cause the network node to estimate, prior to applying the precoding operation to the downlink physical channel, one or more characteristics of an uplink physical channel between the network node and a user equipment.

6. The apparatus of claim 5, wherein the one or more processors, to cause the network node to estimate the one or more characteristics of the uplink physical channel between the network node and the user equipment, are configured to cause the network node to estimate the one or more characteristics of the uplink physical channel between the network node and the user equipment in accordance with a sounding reference signal or a demodulation reference signal received from the user equipment.

7. The apparatus of claim 5, wherein the one or more processors are further configured to cause the network node to identify, after estimating the one or more characteristics of the uplink physical channel between the network node and the user equipment, and prior to applying the precoding operation to the downlink physical channel, the downlink physical channel in accordance with a reciprocity characteristic between a plurality of downlink channels and the uplink physical channel.

8. The apparatus of claim 7, wherein the one or more processors, to cause the network node to transmit the plurality of coefficients via the physical downlink control channel communication, are configured to cause the network node to transmit the plurality of coefficients via the physical downlink control channel communication to the user equipment.

9. The apparatus of claim 1, wherein the one or more processors, to cause the network node to obtain the plurality of coefficients, are configured to cause the network node to calculate the plurality of coefficients associated with the non-linearity of the downlink physical channel without performing a matrix transformation.

10. The apparatus of claim 1, wherein the one or more processors, to cause the network node to obtain the plurality of coefficients, are configured to cause the network node to obtain a non-linear interference parameter that is a function of a fast Fourier transform size, a non-linearity associated with a first stream, and a non-linearity associated with a second stream.

11. The apparatus of claim 1, wherein the one or more processors, to cause the network node to precode the physical downlink shared channel communication in accordance with the result of the precoding operation, are configured to cause the network node to transmit singular value decomposition precoding data to a user equipment in accordance with the result of the precoding operation.

12. The apparatus of claim 1, wherein the plurality of coefficients are associated with a plurality of transmitting antennas for digital post-distortion processing at a user equipment.

13. An apparatus for wireless communication at a user equipment (UE), comprising:
one or more memories; and
one or more processors coupled to the one or more memories, the one or more processors individually or collectively configured to cause the UE to:
receive a physical downlink shared channel communication that includes a precoding data indication;
receive a physical downlink control channel communication that includes a plurality of coefficients;
generate a plurality of non-linearity approximation signals in accordance with the plurality of coefficients; and
cancel the plurality of non-linearity approximation signals from the physical downlink shared channel communication.

14. The apparatus of claim 13, wherein the one or more processors, to cause the UE to cancel the plurality of non-linearity approximation signals from the physical downlink shared channel communication, are configured to cause the UE to perform digital post-distortion processing to cancel the plurality of non-linearity approximation signals from the physical downlink shared channel communication.

15. The apparatus of claim 14, wherein the plurality of non-linearity approximation signals correspond to a plurality of transmitting antennas associated with a network node.

16. The apparatus of claim 13, wherein the precoding data indication included in the physical downlink shared channel communication is associated with a singular value decomposition precoding operation.

17. The apparatus of claim 16, wherein the singular value decomposition precoding operation is associated with a cross-correlation of a plurality of power delay profiles associated with a time domain transformation of the singular value decomposition precoding operation.

18. The apparatus of claim 17, wherein each power delay profile of the plurality of power delay profiles corresponds to a time domain transformation element of a plurality of time domain transformation elements associated with the time domain transformation of the singular value decomposition precoding operation.

19. The apparatus of claim 13, wherein the one or more processors are further configured to cause the UE to transmit a sounding reference signal or a demodulation reference signal to be used for estimating an uplink physical channel, wherein the plurality of coefficients are based at least in part on the sounding reference signal or the demodulation reference signal.

20. The apparatus of claim 13, wherein the one or more processors, to cause the UE to receive the plurality of coefficients, are configured to cause the UE to receive a non-linear interference parameter that is a function of a fast Fourier transform size, a non-linearity associated with a first stream, and a non-linearity associated with a second stream.

21. A method of wireless communication performed by a network node, comprising:
applying a precoding operation to a downlink physical channel;
obtaining a plurality of coefficients associated with a non-linearity of the downlink physical channel in accordance with estimating a cross-correlation of a plurality of power delay profiles associated with the precoding operation;
precoding a physical downlink shared channel communication in accordance with a result of the precoding operation; and
transmitting the plurality of coefficients via a physical downlink control channel communication.

22. The method of claim 21, wherein applying the precoding operation to the downlink physical channel comprises applying a singular value decomposition precoding operation to the downlink physical channel.

23. The method of claim 22, wherein the plurality of power delay profiles are associated with a time domain transformation of the singular value decomposition precoding operation, and wherein each power delay profile of the plurality of power delay profiles corresponds to a time domain transformation element of a plurality of time domain transformation elements associated with the time domain transformation of the singular value decomposition precoding operation.

24. The method of claim 21, further comprising estimating, prior to applying the precoding operation to the downlink physical channel, one or more characteristics of an uplink physical channel between the network node and a user equipment.

25. The method of claim 24, wherein estimating the one or more characteristics of the uplink physical channel between the network node and the user equipment comprises estimating the one or more characteristics of the uplink physical channel between the network node and the user equipment in accordance with a sounding reference signal or a demodulation reference signal received from the user equipment.

26. The method of claim 25, further comprising identifying, after estimating the one or more characteristics of the uplink physical channel between the network node and the user equipment, and prior to applying the precoding operation to the downlink physical channel, the downlink physical channel in accordance with a reciprocity characteristic between a plurality of downlink channels and the uplink physical channel.

27. The method of claim 26, wherein transmitting the plurality of coefficients via the physical downlink control channel communication comprises transmitting the plurality of coefficients via the physical downlink control channel communication to the user equipment.

28. A method of wireless communication performed by a user equipment (UE), comprising:
  receiving a physical downlink shared channel communication that includes a precoding data indication;
  receiving a physical downlink control channel communication that includes a plurality of coefficients;
  generating a plurality of non-linearity approximation signals in accordance with the plurality of coefficients; and
  cancelling the plurality of non-linearity approximation signals from the physical downlink shared channel communication.

29. The method of claim 28, wherein cancelling the plurality of non-linearity approximation signals from the physical downlink shared channel communication comprises performing digital post-distortion processing to cancel the plurality of non-linearity approximation signals from the physical downlink shared channel communication.

30. The method of claim 28, wherein the precoding data indication included in the physical downlink shared channel communication is associated with a singular value decomposition precoding operation, wherein the singular value decomposition precoding operation is associated with a cross-correlation of a plurality of power delay profiles associated with a time domain transformation of the singular value decomposition precoding operation.

* * * * *